(12) United States Patent
Izawa et al.

(10) Patent No.: US 11,061,636 B2
(45) Date of Patent: Jul. 13, 2021

(54) PRINTING DATA GENERATION DEVICE, PRINTING DATA GENERATION METHOD AND STORAGE MEDIUM FOR CREATING BOOKLET

(71) Applicant: SCREEN HOLDINGS CO., LTD., Kyoto (JP)

(72) Inventors: Yo Izawa, Kyoto (JP); Takako Kato, Kyoto (JP); Yoshihiko Onogawa, Kyoto (JP)

(73) Assignee: SCREEN HOLDINGS CO., LTD., Kyoto (JP)

( * ) Notice: Subject to any disclaimer, the term of this patent is extended or adjusted under 35 U.S.C. 154(b) by 0 days.

(21) Appl. No.: 16/281,569

(22) Filed: Feb. 21, 2019

(65) Prior Publication Data

US 2019/0258438 A1    Aug. 22, 2019

(30) Foreign Application Priority Data

Feb. 22, 2018 (JP) .............................. JP2018-029504

(51) Int. Cl.
*G06F 3/12* (2006.01)
*G06K 15/02* (2006.01)
*H04N 1/387* (2006.01)

(52) U.S. Cl.
CPC .......... *G06F 3/1268* (2013.01); *G06F 3/1204* (2013.01); *G06F 3/125* (2013.01); *G06F 3/1251* (2013.01); *G06F 3/1257* (2013.01); *G06F 3/1282* (2013.01); *G06K 15/1805* (2013.01); *H04N 1/387* (2013.01); *G06F 3/1208* (2013.01); *G06F 3/1255* (2013.01)

(58) Field of Classification Search
None
See application file for complete search history.

(56) References Cited

U.S. PATENT DOCUMENTS 7,180,608 B1 * 2/2007 Yu .......................... G06F 3/1285
358/1.1
8,879,111 B2 * 11/2014 Yamasaki ............. G06F 3/1204
358/1.18

(Continued)

FOREIGN PATENT DOCUMENTS

| JP | 2002-175165 A | 6/2002 |
| JP | 2008-155632 A | 7/2008 |

OTHER PUBLICATIONS

U.S. PTO Non-Final Office Action issued in related U.S. Appl. No. 16/281,544, dated Jan. 27, 2020.

(Continued)

*Primary Examiner* — Haris Sabah
(74) *Attorney, Agent, or Firm* — McDermott Will & Emery LLP

(57) ABSTRACT

A print job data generation portion generates print job data, including flatplan information that specifies an actual position of each of pages on a unit printing sheet, based on submission data and a flatplan template. In the case where a page size in the submission data is smaller than a maximum page size defined by the flatplan template, the print job data generation portion determines the position of each of the pages in accordance with an intra-cell positioning rule set in the flatplan template Dt with no change in the folding position represented by the flatplan template.

11 Claims, 15 Drawing Sheets

(56) References Cited

U.S. PATENT DOCUMENTS

| | | |
|---|---|---|
| 2002/0067508 A1 | 6/2002 | Nishikawa et al. |
| 2006/0082793 A1 | 4/2006 | Goel et al. |
| 2007/0136087 A1* | 6/2007 | Yamaguchi ........ G06Q 10/0637 358/1.15 |
| 2007/0229902 A1 | 10/2007 | Sato |
| 2007/0229903 A1 | 10/2007 | Sato |
| 2007/0291309 A1* | 12/2007 | Kurimura ............. G06F 40/114 358/1.18 |
| 2008/0151322 A1 | 6/2008 | Morales et al. |
| 2009/0137374 A1* | 5/2009 | Kobayashi ............ B65H 45/18 493/424 |
| 2009/0279137 A1* | 11/2009 | Mori .................... G06F 3/1212 358/1.15 |
| 2010/0202022 A1 | 8/2010 | Sato |
| 2010/0245909 A1* | 9/2010 | Yamaguchi .......... G06F 3/1204 358/1.15 |
| 2011/0149315 A1 | 6/2011 | Yamazaki |
| 2012/0075673 A1 | 3/2012 | Herr |
| 2014/0018224 A1* | 1/2014 | Kuranoshita ...... G03G 15/5025 493/405 |
| 2015/0268895 A1* | 9/2015 | Igarashi .................. G06F 3/125 358/1.15 |
| 2017/0039459 A1 | 2/2017 | Yamada et al. |

OTHER PUBLICATIONS

U.S. PTO Non-Final Office Action issued in co-pending related U.S. Appl. No. 16/281,544, dated Dec. 10, 2020.
U.S. PTO Final Office Action issued in co-pending related U.S. Appl. No. 16/281,544, dated Aug. 21, 2020.

* cited by examiner

PRINTING DATA GENERATION DEVICE, PRINTING DATA GENERATION METHOD AND STORAGE MEDIUM FOR CREATING BOOKLET

INCORPORATION BY REFERENCE

The present application claims priority under 35 U.S.C. § 119 to Japanese Patent Application No. 2018-029504, filed on Feb. 22, 2018. The contents of this application are incorporated herein by reference in their entirety.

BACKGROUND

The present disclosure relates to a printing data generation device and a printing data generation method that generate printing data to be provided to a printer that performs printing for creating a booklet, such as book printing or the like, and a storage medium.

Generally in a printing system performing printing for bookbinding, flatplan designing is performed before printing data is generated based on submission data. Flatplan designing is to specify positions of a plurality of pages on a printing sheet. Information on the resultant flatplan is generally stored as a template (hereinafter, referred to as a "flatplan template"). In the step of executing a rasterization process (RIP process) on the submission data, a position of each of the pages, included in the submission data, on the printing sheet is determined based on the flatplan template. As a result, in the case where cut sheets are to be used for the printing, a plurality of pages are printed on one printing sheet. In the case where a continuous sheet is to be used for the printing, a plurality of pages are printed on a region corresponding to such one printing sheet. A printed item obtained as described above is subjected to a bookbinding process, and as a result, a booklet, a brochure, a pamphlet or the like is produced. In the following, regarding the printing performed on a continuous sheet, a region, in the printing sheet in the form of a continuous sheet, that is to be one signature for the creation of a booklet will be referred to as a "unit printing sheet". Regarding the printing performed on cut sheets, one cut sheet usually corresponds to a unit printing sheet. There is a case where a plurality of signatures are formed of one cut sheet. In this case, one cut sheet corresponds to a plurality of unit printing sheets. In this specification, the term "booklet" encompasses a pamphlet, a brochure and the like. The term "booklet" and the term "book" are used exchangeably.

Recently, a demand for book printing, namely, printing of, typically, a relatively small number of copies of a booklet by a digital printer, is increasing. In such book printing, printing and bookbinding processes for a plurality of booklets of slightly different page sizes (e.g., A5-size booklets and A6-size booklets) may be performed on one line (by one same printer or one same post-processing device) in a plant. If one same flatplan template is used in such a case, as shown in FIG. 18, folding positions are different for different page sizes (folding lines 71-1 and 71*b*-1 are at different positions, and folding lines 71-2 and 71-*b*2 are at different positions). This requires the post-processing device to be adjusted when the page size is switched. Generally, in order to make it unnecessary to perform such adjustment on the post-processing device, a flatplan template having an offset adjusted in accordance with each of the page sizes may be prepared (hereinafter, referred to as a "common technique").

Japanese Laid-Open Patent Publication No. 2008-155632 describes a method for automatically imposing a plurality of images on a printing sheet with no need to prepare a template for each of the page sizes. According to this method, the time required for a pre-press work in the execution of jobs for various page sizes is shortened. Japanese Laid-Open Patent Publication No. 2002-175165 describes an information processing device that provides an N-page printing function, by which a logical page is located at the center of each of regions obtained by equally dividing a physical sheet into N (N is an integer greater than of 1).

In the case where the above-described common technique is adopted, a plurality of flatplan templates need to be prepared in correspondence with a plurality of page sizes because the offset needs to be adjusted for each page size. This raises the management cost. In addition, the operator needs to choose a flatplan template corresponding to the page size of each submission data, which increases the amount of work of the operator.

The information processing device described in Japanese Laid-Open Patent Publication No. 2002-175165 also requires the post-processing device to be re-adjusted in the case where the printing and bookbinding processes for a plurality of booklets of different page sizes are to be performed on one line.

SUMMARY

The present disclosure has an object of realizing a printing data generation device and a printing data generation method that generate printing data that does not require re-adjustment on a post-processing device, with no increase in the management cost or the amount of work even in the case where a plurality of booklets of different page sizes are to be produced, and a storage medium.

A first aspect of the present disclosure is directed to a printing data generation device receiving submission data in a print job for creation of a booklet and generating printing data to be supplied to a printer, the printing data generation device comprising:

a layout information acquisition portion configured to acquire layout information that specifies a position of each of page regions and a second direction post-process reference position on a unit printing sheet, which is a region in a printing sheet that is to be one signature for the creation of the booklet, the second direction post-process reference position being a reference position on the basis of which a post-process is performed after printing is performed based on the printing data, the second direction post-process reference position being the reference position in a second direction perpendicular to a first direction, which is a printing sheet feeding direction;

a positioning rule setting portion configured to set an intra-cell positioning rule that designates a position of a printing region in each of the page regions;

a page position determination portion configured to determine a position of each of the pages to be imposed on the unit printing sheet, in accordance with a page size included in the submission data, while fixing the second direction post-process reference position, the position of each of the pages being determined based on the layout information acquired by the layout information acquisition portion and the intra-cell positioning rule set by the positioning rule setting portion; and a data conversion portion configured to convert the submission data into the printing data based on the position of each of the pages determined by the page position determination portion.

According to a second aspect of the present disclosure, preferably, in the first aspect of the present disclosure, the intra-cell positing rule set by the positioning rule setting portion includes one positioning rule selected from alignment along a gutter, alignment along a fore edge and alignment at a center as a positioning rule in a left-right direction of the booklet, and includes one positioning rule selected from alignment along a head, alignment along a tail and alignment at a center as a positioning rule in a top-bottom direction of the booklet.

According to a third aspect of the present disclosure, preferably, in the first or second aspect of the present disclosure, the layout information acquisition portion acquires a size of a peripheral region, to be provided around four sides of the page region when the printing is performed by the printer, the size being acquired as a part of the layout information; and the page position determination portion determines the position of each of the pages to be imposed on the unit printing sheet in view of the size of the peripheral region.

According to a fourth aspect of the present disclosure, preferably, in the third aspect of the present disclosure, the peripheral region includes at least one of a bleed region and a margin region; and the page position determination portion determines the position of each of the pages to be imposed on the unit printing sheet in view of a size of the at least one of the bleed region and the margin region.

According to a fifth aspect of the present disclosure, preferably, in any one of the first through fourth aspects of the present disclosure, the layout information acquisition portion is configured to acquire the layout information by accepting an input operation by an operator; and the positioning rule setting portion is configured to set the intra-cell positioning rule by accepting an input operation by the operator.

According to a sixth aspect of the present disclosure, preferably, in any one of the first through fifth aspects of the present disclosure, the printer performs the printing on a continuous sheet.

According to a seventh aspect of the present disclosure, preferably, in any one of the first through fifth aspects of the present disclosure, the printer performs the printing on a cut sheet; and the page position determination portion determines the position of each of the pages to be imposed on the cut sheet, the cut sheet being the unit printing sheet.

According to an eighth aspect of the present disclosure, preferably, in any one of the first through seventh aspects of the present disclosure, the printing data generation device further comprises a template holding portion configured to hold the layout information, acquired by the layout information acquisition portion, as a template, wherein the page position determination portion determines the position of each of the pages to be imposed on the unit printing sheet, in accordance with the page size included in the submission data, while fixing the second direction post-process reference position, the position of each of the pages being determined based on the template held by the template holding portion and the intra-cell positioning rule set by the positioning rule setting portion.

According to a ninth aspect of the present disclosure, preferably, in any one of the first through eighth aspects of the present disclosure, the second direction post-process reference position is a folding position along which the unit printing sheet is to be folded in the second direction in a folding process as the post-process.

According to a tenth aspect of the present disclosure, preferably, in the ninth aspect of the present disclosure, the layout information acquisition portion acquires information that specifies a folding position along which the unit printing sheet is to be folded in the first direction in the folding process as the post-process, the information being acquired as a part of the layout information; and the page position determination portion determines the position in the first direction and the position the second direction of each of the pages to be imposed on the unit printing sheet, in accordance with the page size included in the submission data, while fixing the folding positions in the first direction and the second direction, the positions of each of the pages being determined based on the layout information acquired by the layout information acquisition portion and the intra-cell positioning rule set by the positioning rule setting portion.

An eleventh aspect of the present disclosure is directed to a printing data generation method for receiving submission data in a print job for creation of a booklet and generating printing data to be supplied to a printer, the printing data generation method comprising:

a layout information acquisition step of acquiring layout information that specifies a position of each of page regions and a second direction post-process reference position on a unit printing sheet, which is a region in a printing sheet that is to be one signature for the creation of the booklet, the second direction post-process reference position being a reference position on the basis of which a post-process is performed after the printing is performed based on the printing data, the second direction post-process reference position being the reference position in a second direction perpendicular to a first direction, which is a printing sheet feeding direction;

a positioning rule setting step of setting an intra-cell positioning rule that designates a position of a printing region in each of the page regions;

a page position determination step of determining a position of each of the pages to be imposed on the unit printing sheet, in accordance with a page size included in the submission data, while fixing the second direction post-process reference position, the position of each of the pages being determined based on the layout information acquired in the layout information acquisition step and the intra-cell positioning rule set in the positioning rule setting step; and a data conversion step of converting the submission data into the printing data based on the position of each of the pages determined in the page position determination step.

Other aspects of the present disclosure are apparent from the above-described aspects of the present disclosure and the description of the embodiments and the modifications thereof described below, and the descriptions thereof will be omitted.

According to the present disclosure, the position of each of the pages to be imposed on the unit printing sheet, which is to be one signature, is determined in accordance with the page size in the submission data based on the layout information and the intra-cell positioning rule, while the second direction post-process reference position is fixed. Therefore, one same layout information is used regardless of the page size in the submission data, so that the position of each of the pages on the unit printing sheet when printing is performed may be determined while the second direction post-process reference position is fixed. For this reason, the printing data for printing of a plurality of booklets of different page sizes is generated based on one same layout information, so that a work of post-process for the plurality of booklets may be performed with no need to re-adjust the post-processing device. Since it is sufficient to acquire and hold the layout information only once for a plurality of page sizes, the management cost is decreased. As described above, printing data that does not require any re-adjustment on the post-processing device, even in the case where a plurality of booklets of different pages sizes are to be produced, may be generated with no increase in the management cost or the amount of work.

DETAILED DESCRIPTION

Hereinafter, embodiments of the present disclosure will be described with reference to the attached drawings. In the following description, regarding the size of a unit printing sheet and pages, the size in a sheet feeding direction Y (first direction) will be referred to as a "longitudinal size", and the size in a sheet width direction X (second direction) will be referred to as a "lateral size". The longitudinal size corresponds to a "first direction length", and the lateral size corresponds to a "second direction length". The sheet width direction is perpendicular to the sheet feeding direction. The "unit printing sheet" is a region, in a printing sheet in the form of a continuous sheet, that is to be one signature in printing performed on the continuous sheet. Regarding printing performed on cut sheets, one cut sheet usually corresponds to a unit printing sheet. There is a case where a plurality of signatures are formed of one cut sheet. In this case, one cut sheet corresponds to a plurality of unit printing sheets.

1. Embodiment 1

1.1 Overall Structure of the Printing System

Figure 1:
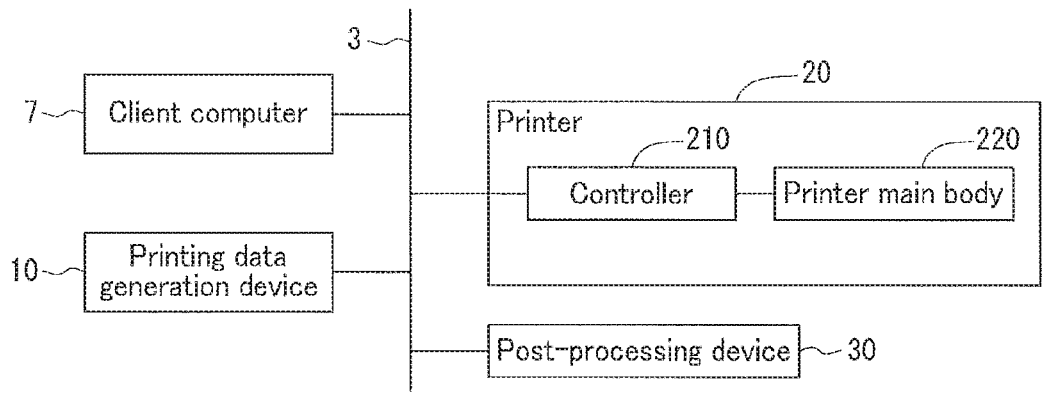
FIG. 1 is a block diagram showing an overall structure of a printing system including a printing data generation device according to embodiment 1 of the present disclosure.

FIG. 1 is a block diagram showing an overall structure of a printing system including a printing data generation device 10 according to embodiment 1 of the present disclosure. This printing system includes a client computer 7 generating and holding data on a printing target or holding data on a printing target transmitted from an external device, a printing data generation device 10 receiving data on a printing target as submission data and executing a data process such as an RIP process (rasterization process) or the like on the submission data to generate printing data, a printer 20 performing color printing based on the printing data, and a post-processing device 30 performing a folding process, cutting or the like of a printing sheet after the printing. The printer 20 includes a printer main body 220 and a controller 210. The client computer 7, the printing data generation device 10, the printer 20 and the post-processing device 30 are communicably connected with each other via a network 3 such as a LAN or the like. In this embodiment, the printer 20 is an inkjet printing device capable of performing printing on a continuous sheet such as a rolled sheet or the like (continuous printing). The printer used in the present disclosure is not limited to this. The post-processing device 30 does not need to be communicably connected with the client computer 7, the printing data generation device 10 or the printer 20.

Figure 2:
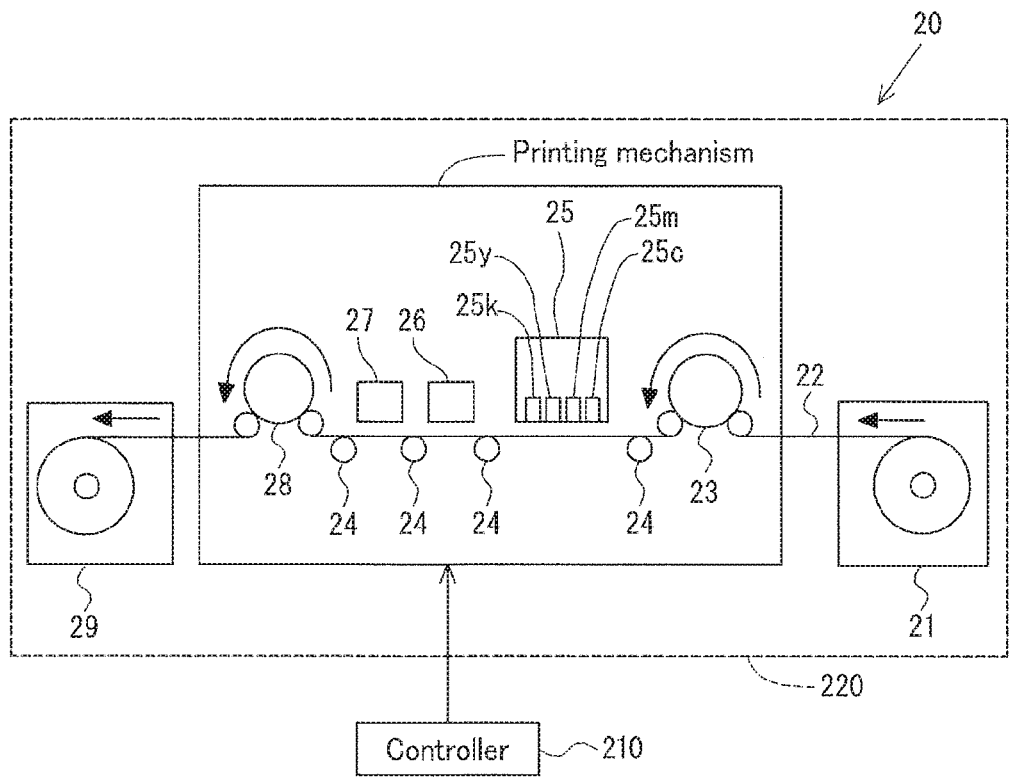
FIG. 2 is a schematic view showing an example of structure of an inkjet printing device, which is a printing device in embodiment 1.

FIG. 2 is a schematic view showing an example of structure of an inkjet printing device as the printer 20 in this embodiment. As described above, the printer 20 includes the printer main body 220 and the controller 210.

The printer main body 220 includes a sheet feeding portion 21 feeding the printing sheet (e.g., rolled sheet) as a base substrate, first driving rollers 23 transporting the printing sheet 22 into a printing mechanism, a plurality of support rollers 24 transporting the printing sheet 22 inside the printing mechanism, a printing portion 25 injecting ink onto a surface of the printing sheet 22 to perform printing, a drier 26 drying the post-printing printing sheet 22, an inspection portion 27 inspecting the state of printing on the printing 22, second driving rollers 28 outputting the printing sheet 22 from the printing mechanism, and a sheet winding portion 29 winding the post-printing printing sheet 22. As can be seen, the printing sheet 22 is transported in a certain transportation direction by the first driving rollers 23 and the second driving rollers 28 from the sheet feeding portion 21 toward the sheet winding portion 29. The printing portion 25 includes a C inkjet head 25c, an M inkjet head 25m, a Y inkjet head 25y and a K inkjet head 25k respectively injecting C (cyan) ink, M (magenta) ink, Y (yellow) ink and K (black) ink.

In the case where the printing is to be performed on both of two surfaces of the printing sheet 22, two such printing mechanisms shown in FIG. 2 are coupled with each other via a known inversion unit. In this case, a first printing mechanism performs the printing on a front surface of the printing sheet 22. Then, the printing sheet 22 is turned upside down by the inversion unit, and a second printing mechanism performs the printing on a rear surface of the printing sheet 22.

The controller 210 controls an operation of the printer main body 220 having the above-described structure. Upon receipt of a command of print output, the controller 210 controls the operation of the printer main body 220 so as to transport the printing sheet 22 from the sheet feeding portion 21 to the sheet winding portion 29. While the printing sheet 22 is being transported, first, the inkjet heads 25c, 25m, 25y and 25k in the printing portion 25 inject ink to perform the printing, next, the drier 26 dries the printing sheet 22, and then, the inspection portion 27 inspects the printing state.

In this example, the printer 20 performing color printing is described. The present disclosure is also applicable to a case where a printer performing monochrome printing is adopted. The colors usable for the printing are not limited to the four colors of CMYK, and may include a spot color such as green, orange or the like. The printing system is not limited to the inkjet printing, and may be replaced with a toner system, a liquid toner system or the like.

1.2 Structure of the Printing Data Generation Device

<1.2.1 Hardware Configuration>

Figure 3:
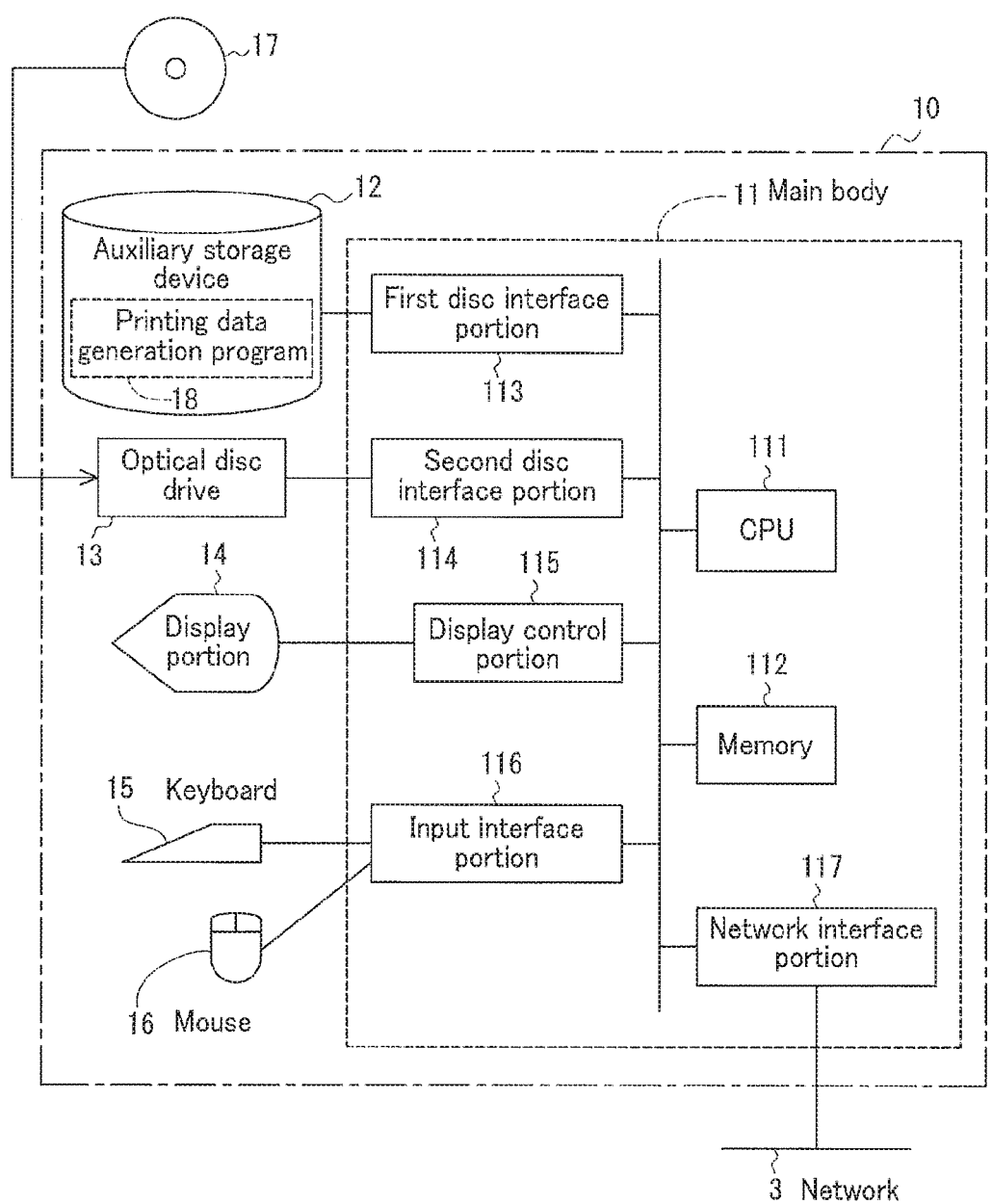
FIG. 3 is a block diagram showing a hardware configuration of the printing data generation device according to embodiment 1.

FIG. 3 is a block diagram showing a hardware configuration of the printing data generation device 10. As shown in FIG. 3, the printing data generation device 10 includes a main body 11, an auxiliary storage device 12, an optical disc drive 13, a display portion 14, a keyboard 15, a mouse 16, and the like. The main body 11 includes a CPU 111, a memory 112, a first disc interface portion 113, a second disc interface portion 114, a display control portion 115, an input interface portion 116, and a network interface portion 117. The CPU 111, the memory 112, the first disc interface portion 113, the second disc interface portion 114, the display control portion 115, the input interface portion 116 and the network interface portion 117 are connected with each other via a system bus. The first disc interface portion 113 is connected with the auxiliary storage device 12. The second disc interface portion 114 is connected with the optical disc drive 13. The display control portion 15 is connected with the display portion (display device) 14. The input interface portion 116 is connected with the keyboard 15 and the mouse 16. The network interface portion 117 is connected with the network 3. The auxiliary storage device 12 is a magnetic disc drive or the like. An optical disc 17 as a computer-readable storage medium such as a DVD (Digital Versatile Disc), a CD-ROM (Compact Disc Read Only Memory) or the like is inserted into the optical disc drive 13. The display portion 14 is a liquid crystal display or the like. The display portion 14 is used to display information desired by an operator. The keyboard 15 and the mouse 16 are used by the operator to input an instruction to the printing data generation device 10.

The auxiliary storage device 12 has stored thereon a printing data generation program 18 causing execution of a process of generating printing data from submission data (printing data generation process). The CPU 111 realizes various functions of the printing data generation device 10 by reading into the memory 112, and executing, the printing data generation program 18 stored on the auxiliary storage device 12. The memory 112 includes a RAM (Random Access Memory) and a ROM (Read Only Memory). The memory 112 acts as a work area in which the CPU 111 executes the printing data generation program 18 stored on the auxiliary storage device 12. The printing data generation program 18 is provided as being stored on a computer-readable storage medium (non-transitory computer-readable storage medium) such as a DVD or the like described above. Namely, a user, for example, inserts the optical disc 17 as a storage medium of the printing data generation program 18 into the optical disc drive 13 after purchasing the optical disc 17, and causes the printing data generation program 18 to be read from the optical disc 17 and installed onto the auxiliary storage device 12. Alternatively, the user may cause the printing data generation program 18, transmitted via the network 3, to be received by the network interface portion 117 and installed onto the auxiliary storage device 12.

<1.2.2 Functional Structure>

Figure 4:
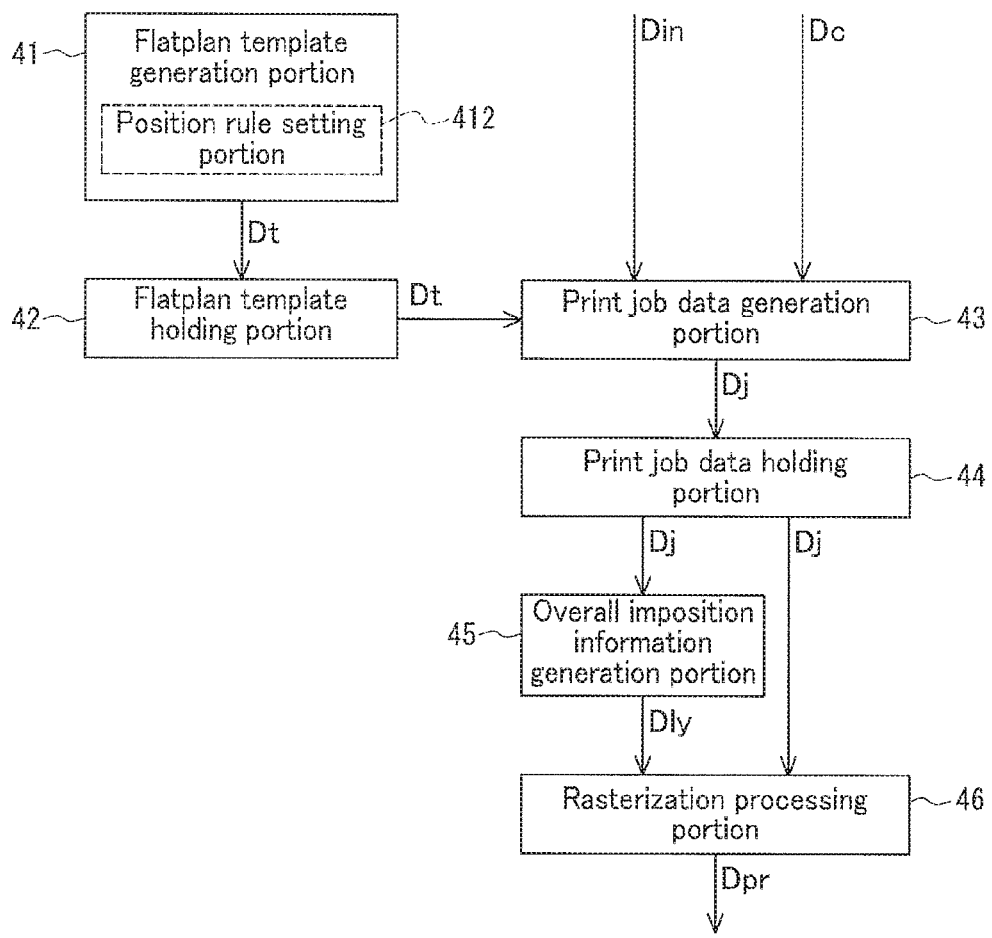
FIG. 4 is a block diagram showing a functional structure of the printing data generation device according to embodiment 1.

FIG. 4 is a block diagram showing a functional structure of the printing data generation device 10 in this embodiment. As shown in FIG. 4, the printing data generation device 10 functionally includes a flatplan template generation portion 41, a flatplan template holding portion 42, a print job data generation portion 43, a print job data holding portion 44, an overall imposition information generation portion 45, and a rasterization processing portion 46.

Figure 5:
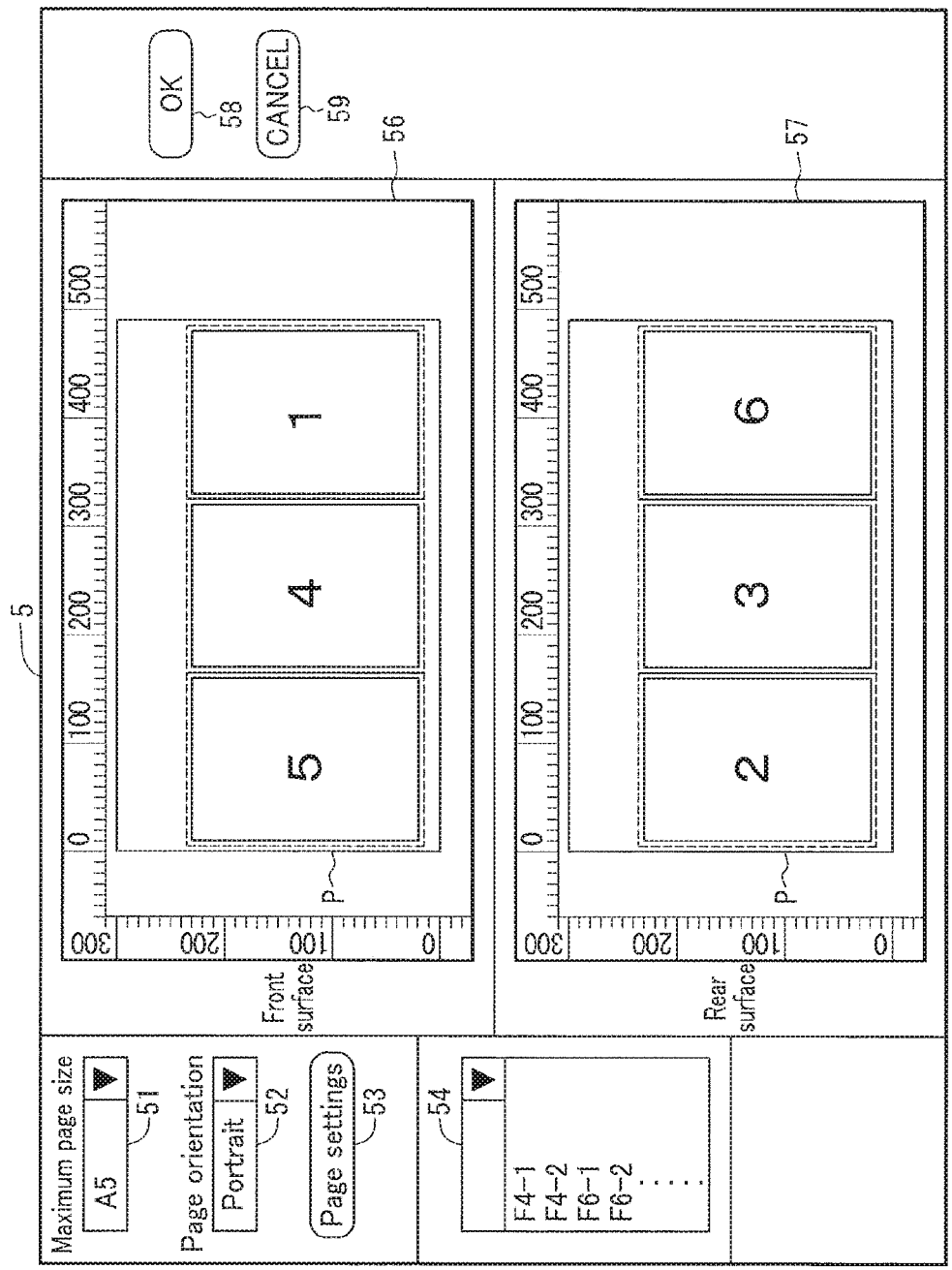
FIG. 5 shows an example of basic designing screen of a flatplan designing screen in embodiment 1.
Figure 6:
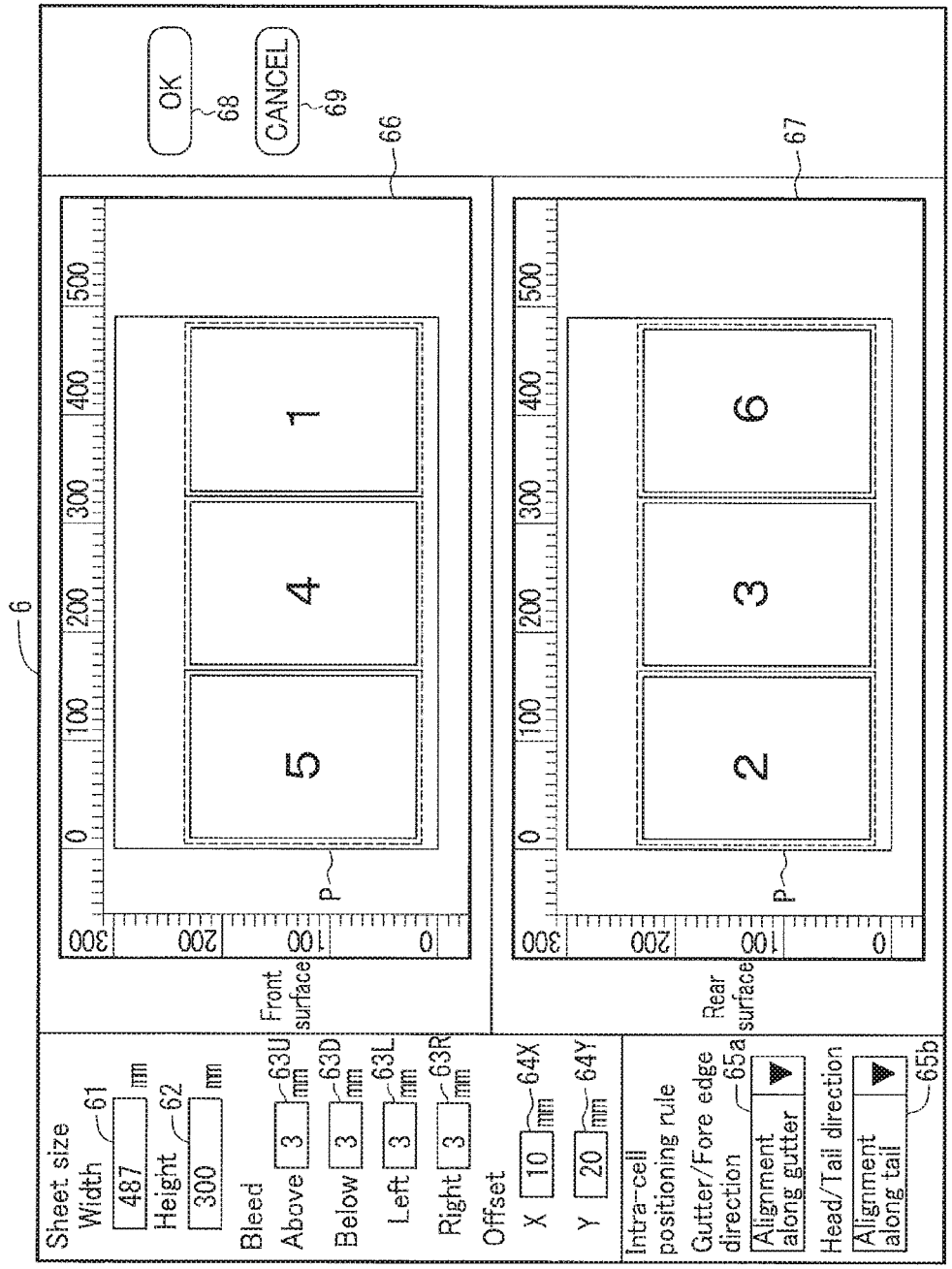
FIG. 6 shows an example of detailed designing screen of the flatplan designing screen in embodiment 1.

The flatplan template generation portion 41 displays, on the display portion 14, a flatplan designing screen as an operation screen on which the above-described flatplan designing is to be performed, and generates a flatplan template Dt based on an operation made by the operator to the flatplan designing screen (i.e., based on the contents of the flatplan designing). In this embodiment, the flatplan designing screen includes a basic designing screen 5 as shown in FIG. 5 and a detailed designing screen 6 as shown in FIG. 6. The basic designing screen 5 and the detailed designing screen 6 are switchable by, for example, selecting a tab (not shown in FIG. 5 or FIG. 6) provided at an end of the screen. A sheet size of the unit printing sheet P displayed on the basic designing screen 5 is assumed to be specified by a different screen in advance.

As shown in FIG. 5, the basic designing screen 5 includes a dropdown list 51 to be used to select a maximum page size, a dropdown list 52 to be used to select a page orientation, a page setting button 53 to be used to make various detailed settings, a dropdown list 54 to be used to select a folding catalog, a front surface layout display region 56 displaying a layout on the front surface of the unit printing sheet P, a rear surface layout display region 57 displaying a layout on the rear surface of the unit printing sheet P, an OK button 58 to be used to save the contents of the settings, and a CANCEL button 59 to be used to cancel the contents of the settings. The sheet size of the unit printing sheet P is designated in advance. Therefore, when the maximum page size is selected from the dropdown list 51 and the page orientation is selected from the dropdown list 52, the number of pages to be located in the sheet width direction (hereinafter, referred to as a "sheet width direction number-of-pages") is determined. In the following, the "sheet width direction number-of-pages" refers to a total number of the pages located in the sheet width direction on the front surface and the rear surface. In the shown in FIG. 5, the sheet width direction number-of-pages is 6. The "folding catalog" defines a pattern of folding to be used to fold the printed items after the printing. From the dropdown list 54, a folding catalog conforming to the standards defined by CIP4, which is the International Cooperation for the Integration of Processes in Prepress, Press and Postpress Organization, is selectable. When a folding catalog is selected from the dropdown list 54, the sheet width direction number-of-pages is specified based on the selected folding catalog. In the case where the sheet width direction number-of-pages specified based on the selected folding catalog does not match the sheet width direction number-of-pages determined by the maximum page size selected from the dropdown list 51, the sheet width direction number-of-pages specified by the selected folding catalog is prioritized, and the maximum page size is calculated based on the sheet width direction number-of-pages and the sheet size.

Immediately after the basic designing screen 5 is displayed in order to create a new flatplan template Dt, neither the page size nor the page orientation has been selected (it should be noted that there may be default settings), and no page is located on the unit printing sheet P on the front surface layout display region 56 or the rear surface layout display region 57. In this state, the operator selects a maximum page size from the dropdown list 51, and selects the page orientation from the dropdown list 52. The information on the page sizes selectable from the dropdown list 51 includes information on the longitudinal size and information on the lateral size. For example, in the case where the page orientation is the portrait orientation, the information that the page size is A5 includes information that the longitudinal size is 210 mm and information that the lateral size is 148 mm. In the case of wishing to designate a page size other than the page sizes selectable from the dropdown list 51, the operator may press the page setting button 53 to designate the longitudinal size and the lateral size as the page size. The maximum page size selected from the dropdown list 51 (including the size specified by pressing the page setting button 53) is a size representing a maximum region permitted to be allocated as a one-page region. In other words, the maximum page size in the submission data Din, based on which the print job data Dj is allowed to be generated by use of the flatplan template Dt which is being created, is selected from the dropdown list 51. The page size is designated by use of the basic designing screen 5 as described above, so that the maximum value of the longitudinal size and the maximum value of the lateral size of the pages to be located on the unit printing sheet P are determined. The page size selected in this step is desirably a size representing a maximum region (maximum page size) permitted to be allocated as a one-page region based on the sheet size of the unit printing sheet P and the number of the pages to be allocated to the unit printing sheet P, but is not limited to such a size.

After selecting the maximum page size and the page orientation, the operator selects one folding catalog from the dropdown list 54, and makes a drag-and-drop operation from the region of the dropdown list 54 into the front surface layout display region 56. For example, when a folding catalog "F6-1" is selected, the basic designing screen 5 is as shown in FIG. 5. Specifically, three pages are located on the unit printing sheet P on the front surface layout display region 56, and three pages are located on the unit printing sheet P on the rear surface layout display region 57. In the unit printing sheet P shown in FIG. 5, the solid rectangles each represent a page region, and the dashed rectangles each represent a region formed of the page region and a bleed region (hereinafter, such a region will be referred to as a "page-and-bleed region") (this is also applicable to FIG. 6, FIG. 8, FIG. 9 and FIG. 17 referred to below). The numerical figures in the rectangular page regions represent page numbers of the respective pages. Specifically, in FIG. 5, the front surface layout display region 56 shows that page 5, page 4 page 1 are to be sequentially located (from left to right in the figure) on the front surface of the unit printing sheet P. The rear surface layout display region 57 shows that page 2, page 3 and page 6 are to be sequentially located (from left to right in the figure) on the rear surface of the unit printing sheet P. It is also shown by a combination of the front surface layout display region 56 and the rear surface layout display region 57 that page 2 is on the back of page 1, page 3 is on the back of page 4, and page 6 is on the back of page 5. A peripheral region provided around the page region is not limited to the "bleed region", and may be a "margin region (additional region on which no image is provided)". In this embodiment, an example in which the bleed region is provided around the page region as the peripheral region will be described. As the peripheral region, the margin region may be provided instead of, or in addition to, the bleed region, and the size of the margin region may be allowed to be designated.

As shown in FIG. 6, the detailed designing screen 6 includes a text box 61 to be used to designate the width (lateral size) of the unit printing sheet P, a text box 62 to be used to designate the height (longitudinal size) of the unit printing sheet P, text boxes 63U, 63D, 63L and 63R to be used to designate sizes of the bleed regions provided above, below, to the left, and to the right of the pages, text boxes 64X and 64Y to be used to designate "offsets in the X direction and the Y direction" that specify distances from a predetermined reference position (in this embodiment, the predetermined reference position is assumed to be the bottom left coordinate of the unit printing sheet P) to the page position regions, a dropdown list to be used to set an intra-cell positioning rule, which is a rule regarding actual positioning of the pages in a page region of the maximum permitted size (hereinafter, such a page region will be referred to as an "initial cell" or simply as a "cell"), a front surface layout display region 66 displaying a layout on the front surface of the unit printing sheet P, a rear surface layout display region 67 displaying a layout on the rear surface of the unit printing sheet P, an OK button to be used to save the contents of the settings, and a CANCEL button 69 to be used to cancel the contents of the settings. The dropdown list to be used to set the intra-cell positioning rule includes a dropdown list 65a to be used to select a positioning rule in a gutter/fore edge direction (hereinafter, referred to also as a "left-right direction"), and a dropdown list 65b to be used to select a positioning rule in a head/tail direction (hereinafter, referred to also as a "top-bottom direction"). The intra-cell positioning rule qualitatively designates the actual position of the page, which corresponds to the printing region in each of the page regions of the maximum permitted size. This will be described below in detail.

Figure 7:
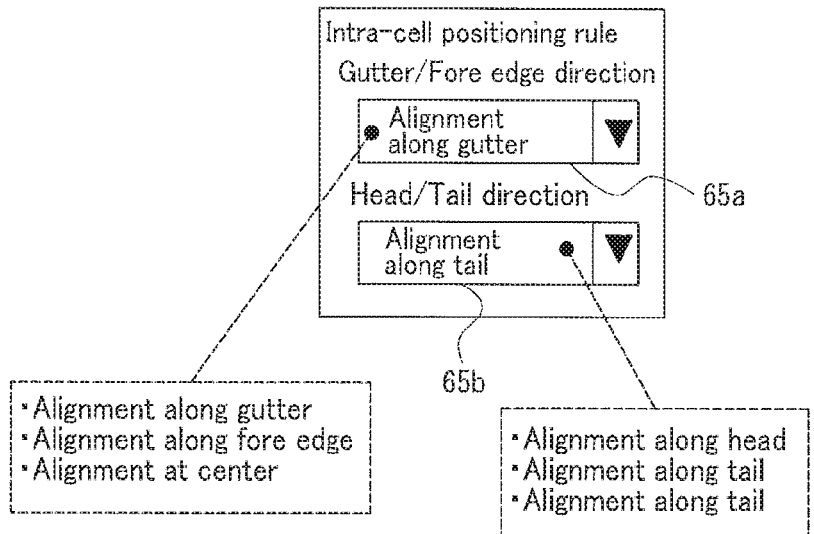
FIG. 7 shows an input operation to set intra-cell positioning rules in embodiment 1.

Immediately after the detailed designing screen 6 is displayed to create the new flatplan template Dt (immediately after the basic designing screen 5 is switched to the detailed designing screen 6), the sheet size is a pre-designated size. Neither the sizes of the bleed position regions 101a through 101f nor the offsets have been designated (it should be noted that there may be default settings). No intra-cell positioning rule has been set (it should be noted that there may be default settings). The display state of the front surface layout display region 66 is the same as the display state of the front surface layout display region 56 immediately therebefore, and the display state of the rear surface layout display region 67 is the same as the display state of the rear surface layout display region 57 immediately therebefore. In this state, the operator designates the sizes of the bleed regions (inputs values to the text boxes 63U, 63D, 63L and 63R), designates the offsets (inputs values to the text boxes 64X and 64Y), selects the intra-cell positioning rule in the left-right direction (gutter/fore edge direction) from the dropdown list 65a, and selects the intra-cell positioning rule in the top-bottom direction (head/tail direction) from the dropdown list 65b. As shown in FIG. 7, for the left-right direction (gutter/fore edge direction), any one of "alignment along a gutter", "alignment along a fore edge" and "alignment at a center" may be selected as the positioning rule. For the top-bottom direction, any one of "alignment along a head", "alignment along a tail" and "alignment at a center" may be selected as the positioning rule. "Alignment along a gutter", "alignment along a fore edge" and "alignment at a center" provided as the positioning rules in the left-right direction of a booklet respectively indicate that "locating so as to contact the margin on the binding side of the booklet", "locating so as to contact the edge opposite to the binding side of the booklet (contact the fore edge)", and "locating at a center of the booklet". "Alignment along a head", "alignment along a tail" and "alignment at a center" provided as the positioning rules in the top-bottom direction of the booklet respectively indicate that "locating so as to contact the top edge (head) of the booklet", "locating so as to contact the bottom edge (tail) of the booklet", and "locating at a center of the booklet".

In the above, the sizes of the bleed regions are designated by use of the text boxes 63U, 63D, 63L and 63R, and the offsets are designated by use of the text boxes 64X and 64Y. Alternatively, a box to be used to designate the sizes of the margin regions or the offsets may be provided instead or, in addition to, the boxes 63U, 63D, 63L, 63R, 64X and 64Y.

Figure 8:
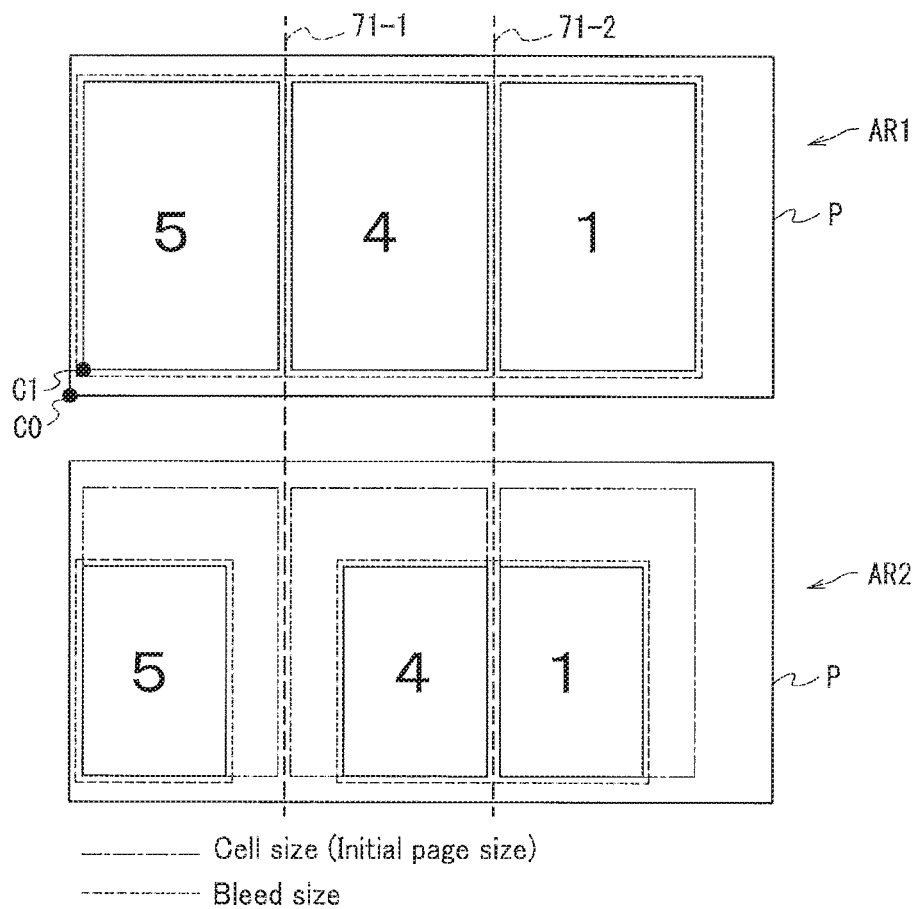
FIG. 8 is shows an adjustment on the position of each of the pages based on the intra-cell positioning rules set in embodiment 1.

Now, with reference to FIG. 8, the positions of each page on the unit printing sheet P will be described. The flatplan template Dt generated as described above shows a page arrangement AR1, as shown in an upper half of the sheet of FIG. 8, in the unit printing sheet P. The page arrangement AR1 shows page positions by which the page size is maximum under the condition that the sheet size designated in advance and the layout information on the folding catalog or the like selected or designated by use of the basic designing screen 5 and the detailed designing screen 6 (see FIG. 5 and FIG. 6) are used. For the page arrangement AR1, first, a bottom left coordinate C1 of the page to be located at the leftmost position in FIG. 8 among the page regions to be located on the unit printing sheet P is defined based on the offsets designated by use of the text boxes 64X and 64Y in the detailed designing screen 6. In the example shown in FIG. 6, the bottom left coordinate C1 is the coordinate of a position that is distanced from a reference position C0 (bottom left coordinate of the unit printing sheet P) by 10 mm in an X-axis direction and by 20 mm in a Y-axis direction. Next, the position of each of the page regions to be located on the unit printing sheet P (in the example shown in FIG. 8, each of page 5, page 4 and page 1) is determined such that the page regions of the maximum permitted size are located based on the width of the unit printing sheet P (value of the text box 61 in the detailed designing screen 6), the bottom left coordinate C1, the number of the pages to be located on the unit printing sheet P (sheet width direction number-of-pages), and the sizes of the bleed regions (values of the text boxes 63U, 63D, 63L and 63R). In addition, the positions of folding lines 71-1 and 71-2 (hereinafter, referred to as "folding positions") in the sheet width direction in the case where the unit printing sheet P is a signature are determined.

In the example shown in FIG. 6 and FIG. 7, "alignment along a gutter" is selected as the intra-cell positioning rule in the gutter/fore edge direction, and "alignment along a tail" is selected as the intra-cell positioning rule in the head/tail direction. With such intra-cell positioning rules, in the case where the page size in the submission data Din (hereinafter, referred to as an "actual page size") is smaller than the maximum page size, an actual arrangement AR2 shown in a lower half of the sheet of FIG. 8 is provided for the pages to be imposed on the unit printing sheet P. The folding positions corresponding to the actual arrangement AR2 are not changed in accordance with the actual page size, and are the same as the folding positions represented by the flatplan template Dt described below (see FIG. 8) (described below in detail).

When the OK button 58 of the basic designing screen 5 or the OK button 68 of the detailed designing screen 6 is pressed, the flatplan template Dt is generated based on the contents of the settings in the flatplan designing screen (the basic designing screen 5, the detailed designing screen 6), and is stored on the flatplan template holding portion 42. Namely, the flatplan template holding portion 42 holds the layout information, generated by the flatplan template generation portion 41, as the flatplan template Dt.

The print job data generation portion 43 generates print job data Dj, which is a group of data required to execute one print job, based on the submission data Din, the flatplan template Dt corresponding to the submission data Din, and information Dc on the number of copies (number of copies on which the submission data Dt is to be printed). The print job data Dj includes the submission data Din, various information including the information Dc on the number of copies, and flatplan information specifying the actual position of each page on the unit printing sheet P when the printing is performed by the printer 20.

In the printing system according to this embodiment, it is not assumed that the flatplan template Dt is prepared for each page size, as is assumed by the above-described common technique. This will be described by way of a unit printing sheet P of a certain sheet size. Typically, the flatplan template Dt is prepared for each number of pages to be located in the sheet width direction of the unit printing sheet P, namely, for each sheet width direction number-of-pages. In order to generate the printing data Dpr by rasterizing the submission data Din, information that specifies a part of each page region (page region of the maximum size), defined in the flatplan template Dt, in which each of the pages included in the submission data Din is to be located is necessary. This information is the above-described flatplan information. Namely, the print job data generation portion 43 determines, based on the submission data Din and the flatplan template Dt corresponding to the submission data Din, the actual position of each of the pages on the unit printing sheet P when the printing is performed by the printer 20, and generates the information on the determined positions as the flatplan information. In this embodiment, the flatplan template Dt as the layout information sets the intra-cell positioning rules selected by use of the detailed designing screen 6 (FIG. 6). Alternatively, the flatplan template Dt may not set the intra-cell positioning rules (may not include information on the intra-cell positioning rules) (see the modification described below).

Now, how the position of each of the pages is determined based on the submission data Din and the flatplan template Dt will be described. As described above, the flatplan template Dt shows the position of each of the page regions in the unit printing sheet P in the case where the page size is maximum. Therefore, the lateral size of each of the pages included in the submission data Din is often shorter than the lateral size designated by the flatplan template Dt. In this case, each of the pages in the submission data Din is located in a part of a cell corresponding to the page, among a plurality of cells, which are a plurality of page regions represented by the flatplan template Dt. The part, of the cell, in which the page is to be located is determined in accordance with the page size in the submission data Din, based on the intra-cell positioning rules set in the flatplan template Dt with no change in the folding positions (positions of the folding lines 71-1 and 71-2, shown in FIG. 8, in the left-right direction). In the example shown in FIG. 6 and FIG. 7, "alignment along the gutter" is selected as the intra-cell positioning rule in the gutter/fore-edge direction and "alignment along the tail" is selected as the intra-cell positioning rule in the head/tail direction. Therefore, in this example, the page-and-bleed region of page 1 and the page-and-bleed region of page 4 are located to contact each other along the second folding line 71-2 and also to contact the bottom end of the page-and-bleed region having the maximum size in the unit printing sheet P. The page-and-bleed region of page 5 is located at a position symmetrical to the page-and-bleed region of page 4 with respect to the first folding line 71-1 (namely, the page-and-bleed region of page 5 is located to contact the left end of the cell corresponding thereto). As described above, in the case where the actual page size (page size in the submission data Din) is smaller than the maximum size represented by the flatplan template Dt, each of the pages in the submission data Din is located in the corresponding cell in accordance with the intra-cell positioning rules based on the actual page size with no change in the folding lines (positions of the folding lines 71-1 and 71-2).

Figure 9:
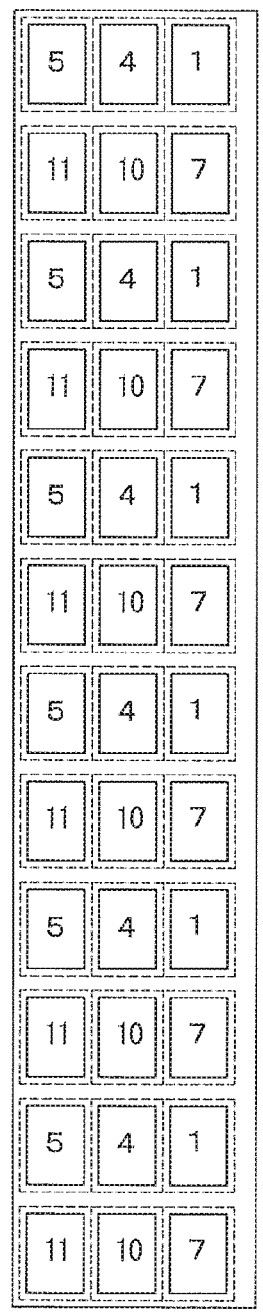
FIG. 9 schematically shows overall imposition information in embodiment 1.

The print job data holding portion 44 holds the print job data Dj generated by the print job data generation portion 43. The overall imposition information generation portion 45 generates overall imposition information Dly representing an imposition layout of all pages included in the submission data Din, based on the submission data Din included in the print job data Dj, the information Dc on the number of copies and the flatplan information (information on the position of each of the pages). The overall imposition information Dly is information that represents the layout of each of pages corresponding to one copy of a booklet, among the information as schematically shown in FIG. 9. Namely, the overall imposition information Dly is information based on which the positions of all the pages on the printing sheet corresponding to one copy of a booklet is recognized. FIG. 9 shows an example of a case where the submission data is 12-page data and the number of copies is 6, for the convenience of drafting the drawing.

In this embodiment, the rasterization processing portion 46 and the overall imposition information generation portion 45 realize the data conversion portion that converts the submission data Din into the printing data Dpr based on the flatplan information. Namely, the rasterization processing portion 46 executes a rasterization process on the submission data Din included in the print job data Dj based on the overall imposition information Dly generated by the overall imposition information generation portion 45 to generate printing data Dpr, which is data representing the printing target in a bitmap format. The printing data Dpr is transmitted to the printer 20, and the printer 20 performs the print output based on the printing data Dpr. The data format of the printing data Dpr is converted when necessary before the printing data Dpr is transmitted to the printer 20.

In this embodiment, the flatplan template generation portion 41 realizes the layout information acquisition portion, and the print job generation portion 43 realizes the page position determination portion. In this embodiment, the display portion 14, the keyboard 15, the mouse 16 and a part of the printing data generation program 18 that is related to the flatplan designing screen (see FIG. 5 and FIG. 6) realize an operation portion that accepts an input operation made by the operator for the flatplan designing. The operation portion is realized as an element of the flatplan template generation portion 41. The operation portion includes the positioning rule setting portion that sets an intra-cell positioning rule by accepting an input operation of designating the intra-cell positioning rules (see the dropdown lists 65*a* and 65*b* shown in FIG. 6). Therefore, in this embodiment, the layout information acquisition portion and the positioning rule setting portion 412 are realized by the flatplan template generation portion 41.

1.3 Processing Procedure

Figure 10:
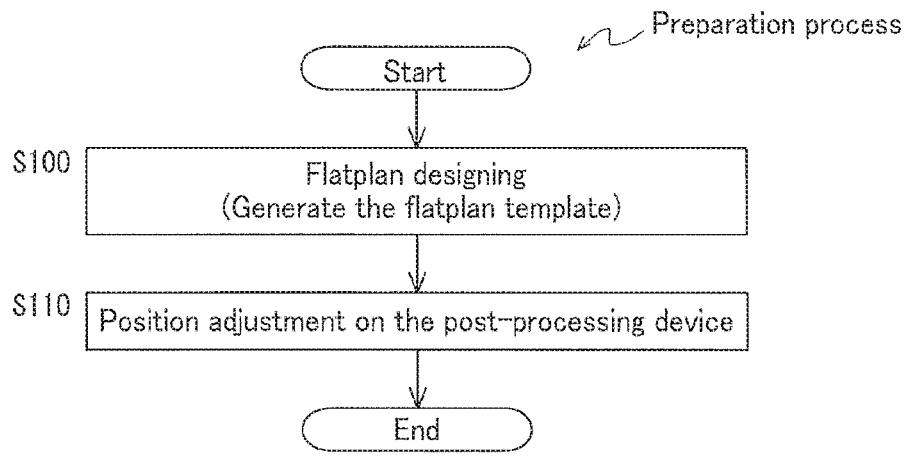
FIG. 10 is a flowchart showing a procedure of a preparation process of a printing data generation process according to embodiment 1.
Figure 11:
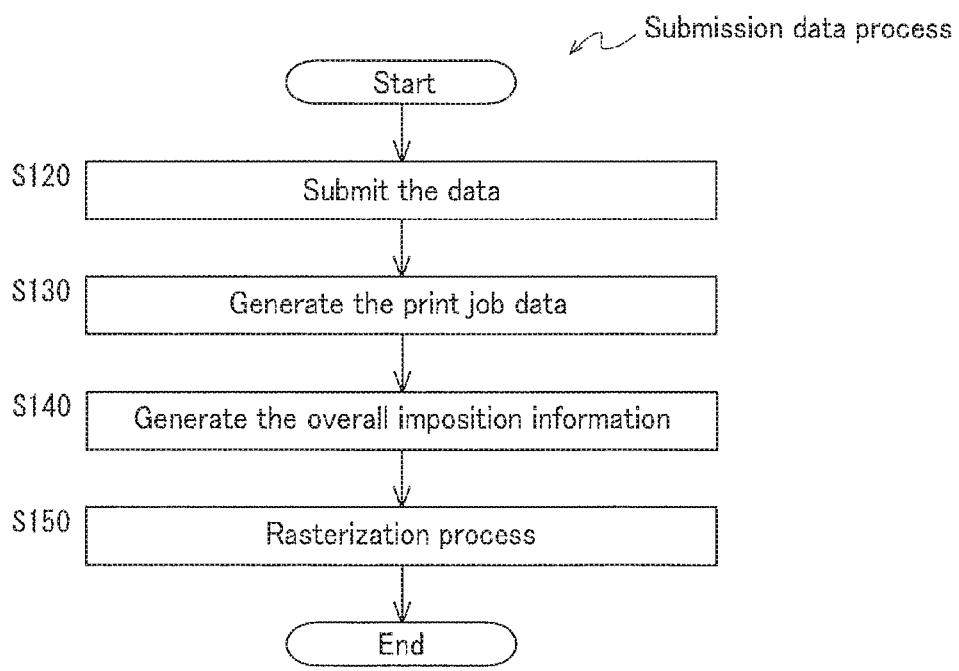
FIG. 11 is a flowchart showing a procedure of a submission data process of the printing data generation process according to embodiment 1.

Now, a procedure of the printing data generation process in this embodiment will be described. The printing data generation process in this embodiment includes a preparation process and a submission data process. FIG. 10 is a flowchart showing a procedure of the preparation process, and FIG. 11 is a flowchart showing a procedure of the submission data process. The procedures represented by the flowcharts of FIG. 10 and FIG. 11 realize an example of the printing data generation method.

As shown in FIG. 10, in the preparation process, the operator designs the flatplan by use of the flatplan designing screen (the basic designing screen 5 and the detailed designing screen 6) (step S100). The process in step S100 does not need to be performed each time the printing data Dpr is to be generated. In the case where the sheet width direction number-of-pages corresponding to the submission data Din to be newly received in step S120 in FIG. 11 (described below) (hereinafter, this sheet width direction number-of-pages will be referred to as a "new sheet width direction number-of-pages") is equal to a sheet width direction number-of-pages corresponding to any of the submission data Din already received (hereinafter, this sheet width direction number-of-pages will be referred to as a "previous sheet width direction number-of-pages"), the process in step S100 is not necessary. A reason for this is that the flatplan template Dt corresponding to the submission data Din to be newly received is already held by the flatplan holding portion 42.

Next, the position adjustment on the post-processing device 30 is performed in accordance with the submission data Din, which is data on the printing target (step S110). In step S110, print job data for a test is generated by use of the flatplan template Dt corresponding to the submission data Din on the printing target, and the print output is performed based on the print job data for the test. A printing sheet having the data printed thereon, which is the result of the print output, is used to perform the position adjustment on the post-processing device 30 (specifically, adjust the folding positions along which the unit printing sheet P is to be folded by the folder in order to create a signature). When the position adjustment is finished, the preparation process in FIG. 10 is finished. A reason why the printing sheet having the data printed thereon is used to perform the position adjustment on the post-processing device 30 is that it is necessary to check the actual printing position on the printing sheet and to accurately adjust the folding positions of the folder. In the case where the new sheet width direction number-of-pages is equal of the sheet width direction number-of-pages for the submission data Din received immediately previously, the process in step S110 may be omitted.

In the submission data process shown in FIG. 11, first, data on the printing target is submitted (step S120). In more detail, data on the printing target that is held on, for example, the client computer 7 is supplied to the printing data generation device 10 as the submission data Din. In this step, the information Dc on the number of copies (number of copies on which the submission data Dt is to be printed) is also supplied. The submission data Din is, for example, data in a PDF (Portable Document Format).

Next, the print job data Dj necessary to execute the print job based on the submission data Din is generated (step S130). The print job data Dj is generated based on the submission data Din and the information Dc on the number of copies supplied to the printing data generation device 10 in step S120 and the flatplan template Dt, generated in step S100, corresponding to the submission data Din.

Next, the overall imposition information Dly, which represents the imposition layout of all the pages to be printed by the printer 20, is generated (step S140). The overall imposition information Dly is generated based on the print job data Dj generated in step S130 (in more detail, the submission data Din and the information Dc on the number of copies supplied to the printing data generation device 10 in step S120 and the flatplan template Dt generated in step S100).

Next, the rasterization process (RIP process) is executed on the submission data Din based on the overall imposition information Dly generated in step S140 (step S150). As a result, the printing data Dpr, which represents the printing target in the bitmap format, is generated. Thus, the submission data process in FIG. 11 is finished, and the printing data generation process is also finished.

Figure 12:
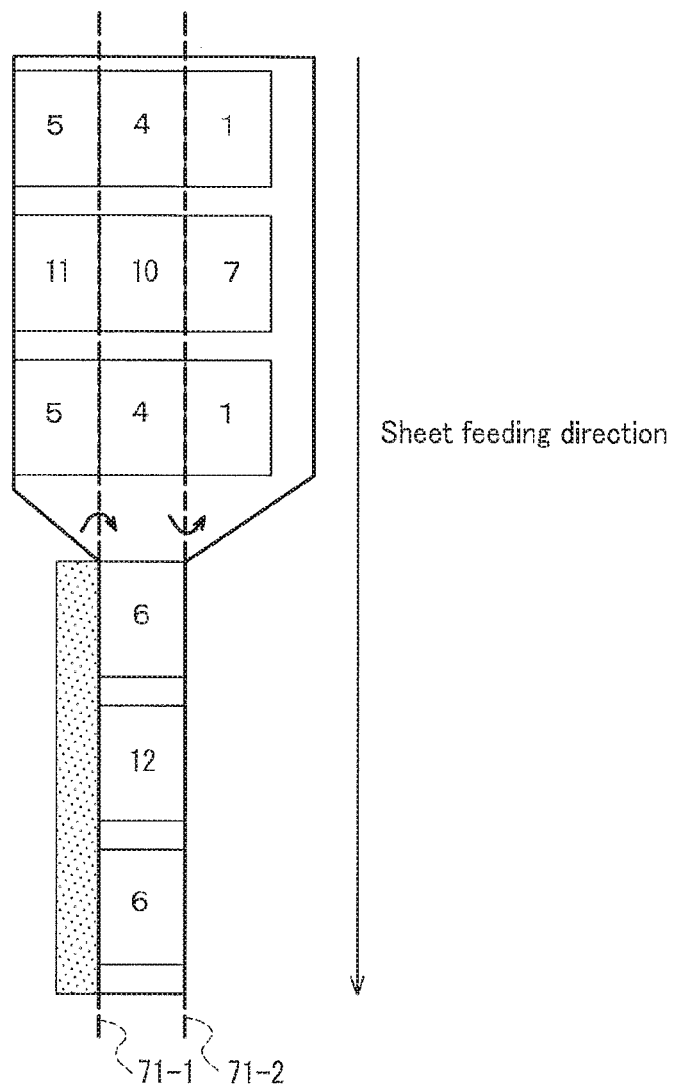
FIG. 12 schematically shows a folding process performed after printing based on printing data generated in embodiment 1.

The printing data Dpr generated by the above-described printing data generation process is transmitted to the printer 20, and the printer 20 performs the printing. Then, the printing sheet having the data printed thereon is transmitted to the post-processing device 30, and as shown in FIG. 12, the folder in the post-processing device 30 performs the folding process while the printing sheet is transported. More specifically, as represented by the arrows in FIG. 12, valley fold is performed along the first folding line 71-1 and mountain fold is performed along the second folding line 71-2. In this embodiment, in this manner, so-called Z-fold is performed along the first folding line 71-1 and the second folding line 71-2. The folding process performed according to the present disclosure is not limited to the "Z-fold" shown in FIG. 12.

In this embodiment, step S100 realizes the layout information acquisition step and the positioning rule setting step, step S130 realizes the page position determination step, and step S150 realizes the data conversion step.

1.4 Operation Example

Figure 13:
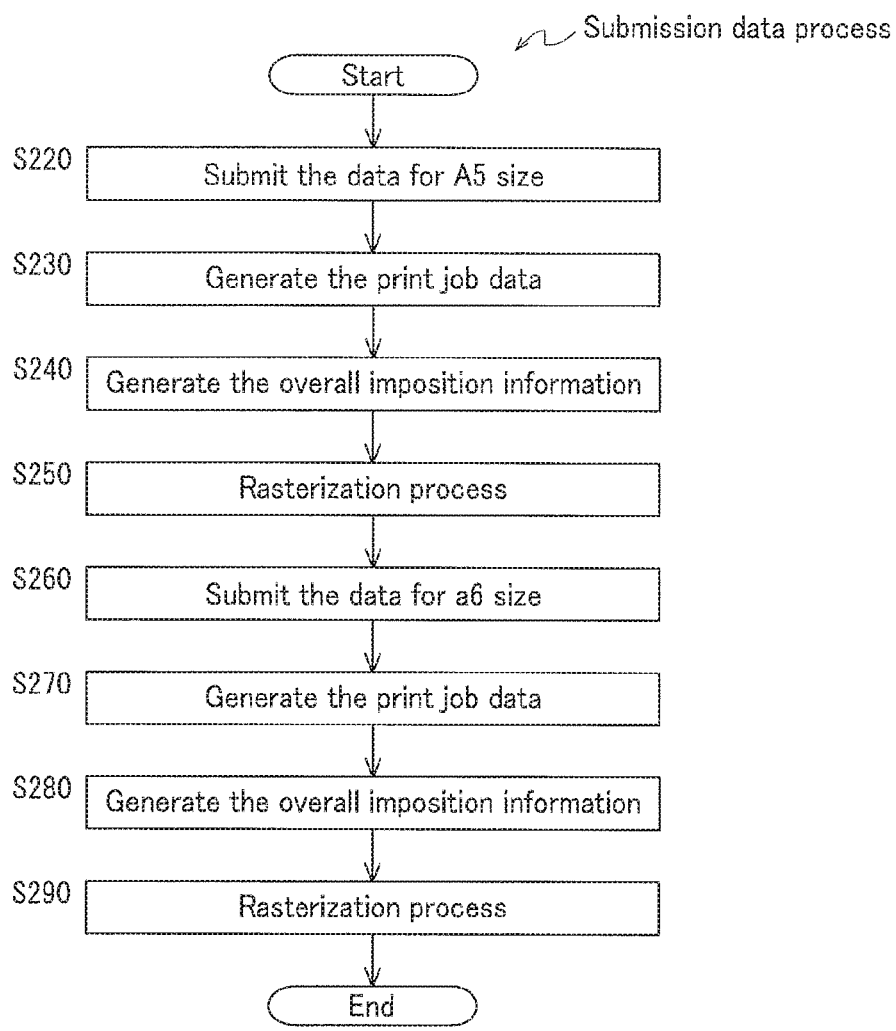
FIG. 13 is a flowchart showing a procedure of a submission data process in embodiment 1 in the case where book printing of A5-size booklets and book printing of A6-size booklets are performed on one line in a plant.

Now, with reference to FIG. 10 and FIG. 13, a procedure of the printing data generation process in the case where book printing of A5-size booklets and book printing of A6-size booklets are performed on one line in a plant will be described. The procedure shown in the flowcharts of FIG. 10 and FIG. 13 realizes an example of the printing data generation method.

In this operation example, the sheet width direction number-of-pages is 6 (the number of pages on one side is 3) in both of the book printing of the A5-size booklets and the book printing of the A6-size booklets. Therefore, first, the preparation process shown in FIG. 10 and described above is performed, so that the flatplan template Dt representing the page arrangement AR1 as shown in the upper half of the sheet of FIG. 8 is created (step S100). The position adjustment on the post-processing device 30 (the adjustment on the folding positions of the folder) is performed based on the first and second folding lines 71-1 and 71-2 represented by the flatplan template Dt (step S110).

The flatplan template Dt generated by the preparation process is held by the flatplan template holding portion 42. In this operation example, the submission data process shown in FIG. 13 is performed in this state. In the submission data process, a printing data generation process for the book printing of the A5-size booklets and a printing data generation process for the book printing of the A6-size booklets are performed continuously.

Specifically, in the submission data process in this operation example, first, data is submitted to print the A5-size booklets (step S220). Then, print job data Dj is generated (S230), overall imposition information Dly is generated (step S240), and the rasterization process is executed (step S250) like in steps S130 through S150 described above.

Next, data is submitted to print the A6-size booklets (step S260). Then, print job data Dj is generated (S270), overall imposition information Dly is generated (step S280), and the rasterization process is executed (step S290) like in steps S130 through S150 described above.

Figure 14:
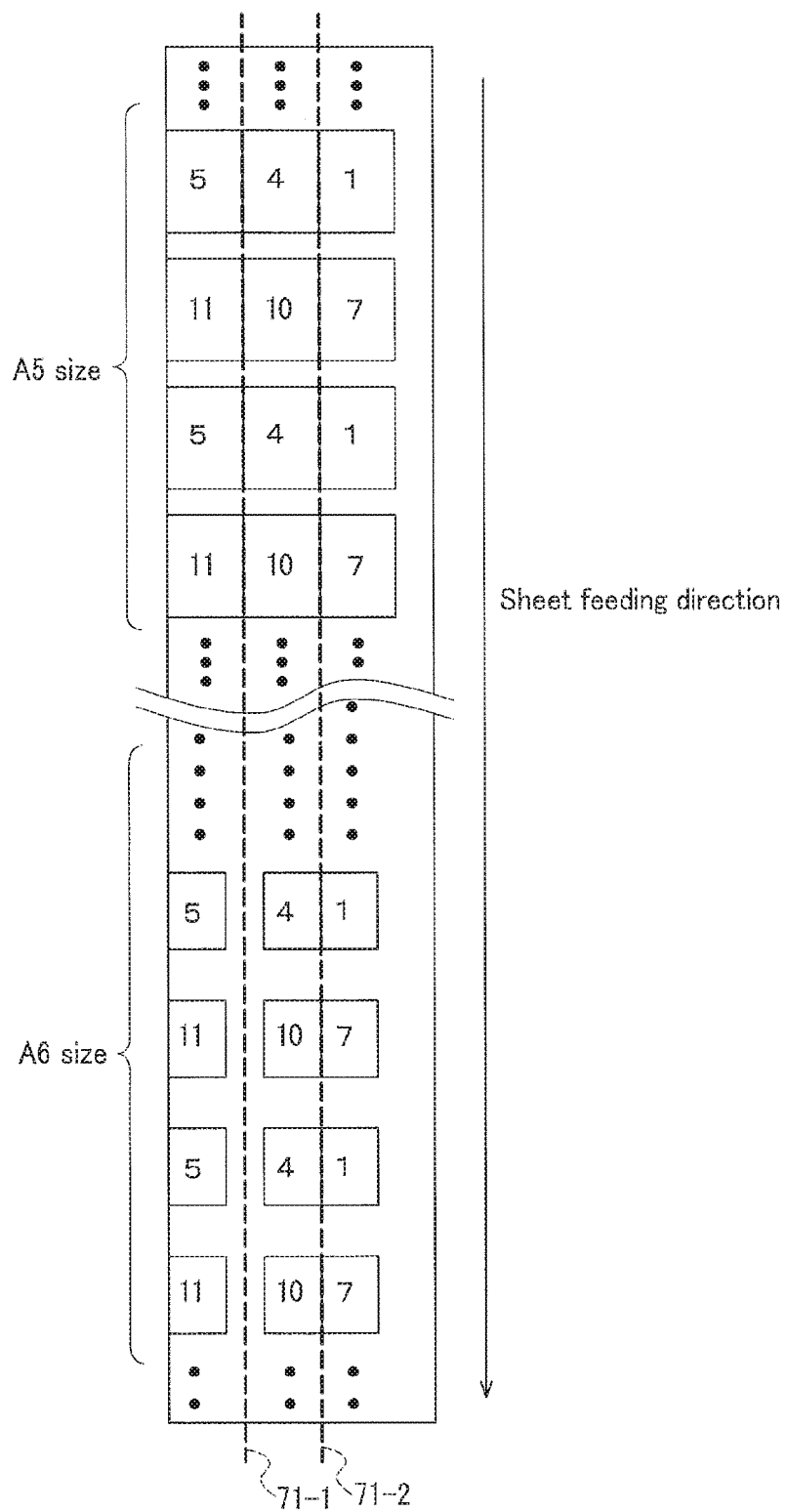
FIG. 14 is a schematic view showing an example of result of print output based on the printing data generated in embodiment 1.

Printing data Dpr generated by the above-described process is transmitted to the printer 20, and the printer 20 performs the print output based on the printing data Dpr. The result of the print output is as schematically shown in FIG. 14. As shown in FIG. 14, regarding the folding lines along which each of rows (page rows each formed of three pages arrayed in the sheet width direction) are to be folded, the first and second folding lines 71-1 and 71-2 in the unit printing sheet on which the A5-size pages are located, and the first and second folding lines 71-1 and 71-2 in the unit printing sheet on which the A6-size pages are located, match each other. In other words, the folding positions of the unit printing sheet are the same for the A5 size and the A6 size. Therefore, when the printing sheet is folded by the folder in the post-processing device 30 after the printing in order to create the booklets, the folding positions of the folder do not need to be re-adjusted between the process for the A5-size booklets and the process for the A6-size booklets.

1.5 Effects

According to this embodiment, in the case where the page size (lateral size) in the submission data Din is smaller than the page size (lateral size) designated by the flatplan template Dt, namely, the maximum permitted size (lateral size), the actual position of each page on the unit printing sheet P when the printing is performed is defined in a region obtained by reducing the page size designated by the flatplan template Dt in accordance with the page size in the submission data Din based on the intra-cell positioning rules while the position of the folding line defined by the flatplan template Dt (second direction post-process reference position) is fixed. Accordingly, as long as the same flatplan template Dt is used, the folding position (position of the folding line) in the unit printing sheet P after the printing is located at one same position. Therefore, the printing data Dpr for the printing of a plurality of booklets of different page sizes is generated based on one same flatplan template Dt, so that the work of folding the sheet as a post-process to produce a plurality of booklets may be performed with no need to re-adjust the post-processing device 30. Since one flatplan template Dt is sufficient for a plurality of page sizes, the management cost is decreased. As described above, according to this embodiment, printing data that does not require any re-adjustment on the post-processing device 30 (re-adjustment on the folding position of the folder), even in the case where a plurality of booklets are to be produced, may be generated with no increase in the management cost or the amount of work (desired effect).

As described above, in this embodiment, the folding position in the sheet width direction (second direction) of the unit printing sheet P along which the unit printing sheet P is to be folded in the folding process as the post-processing process corresponds to the "second direction post-process reference position". Therefore, one same flatplan template Dt (layout information) is used regardless of the page size in the submission data Din, so that the actual position of each of the pages on the unit printing sheet P when the printing is performed may be determined while the folding position in the sheet width direction (second direction) is fixed. Therefore, for the case where the unit printing sheet P is to be folded after the printing, printing data that does not require any re-adjustment on the post-processing device 30 (re-adjustment on the folding position of the folder), even in the case where a plurality of booklets are to be produced, may be generated with no increase in the management cost or the amount of work.

According to this embodiment, the actual position of each of the pages in the sheet feeding direction of the unit printing sheet P when the printing is performed and the actual position of each of the pages in the sheet width direction of the unit printing sheet P when the printing is performed (positions in the first direction and the second direction) may be determined in accordance with the page size in the submission data Din, based on the acquired flatplan template Dt (layout information) and also based on the intra-cell positioning rule including the intra-cell positioning rule in the left-right direction of the booklets selected from alignment along a gutter, alignment along a fore edge and alignment at a center and the intra-cell positioning rule in the top-bottom direction selected from alignment along a head, alignment along a tail and alignment at a center, while the second direction post-process reference position is fixed. In this manner, substantially the same effect as the above-described desired effect is obtained.

According to this embodiment, the second direction post-process reference position is fixed regardless of the page size in the submission data Din, in view of the size of the peripheral region specified by the acquired flatplan template Dt (layout information), so that the actual position of each of the pages on the unit printing sheet P when the printing is performed may be determined. In this manner, substantially the same effect as the above-described desired effect is obtained.

Specifically, the second direction post-process reference position is fixed regardless of the page size in the submission data Din in view of the size of at least one of the bleed region and the margin region specified by the acquired flatplan template Dt (layout information), so that the actual position of each of the pages on the unit printing sheet P when the printing is performed may be determined. In this manner, substantially the same effect as the above-described desired effect is obtained.

According to this embodiment, the second direction post-process reference position is fixed, regardless of the page size in the submission data Din, based on the flatplan template Dt (layout information and intra-cell positioning rule) acquired by accepting an input operation made by the operator, so that the actual position of each of the pages on the unit printing sheet P when the printing is performed may be determined. In this manner, substantially the same effect as the above-described desired effect is obtained.

According to this embodiment, substantially the same effect as the above-described desired effect is obtained in the case where the printing data Dpr to be supplied to the printer 20 that performs printing on a continuous sheet is to be generated.

According to this embodiment, the acquired layout information is held by the flatplan template holding portion 42 as the flatplan template Dt. One same flatplan template Dt is used regardless of the page size in the submission data Din, so that the actual position of each of the pages on the unit printing sheet P when the printing is performed may be determined while the second direction post-process reference position is fixed. In this manner, substantially the same effect as the above-described desired effect is obtained.

2. Embodiment 2

Embodiment 2 of the present disclosure will be described. In this embodiment, the flatplan template Dt is not used, unlike in embodiment 1. The overall structure of the printing system and the hardware configuration of the printing data generation device 100 are substantially the same as those in embodiment 1 and will not be described.

2.1 Functional Structure of the Printing Data Generation Device

Figure 15:
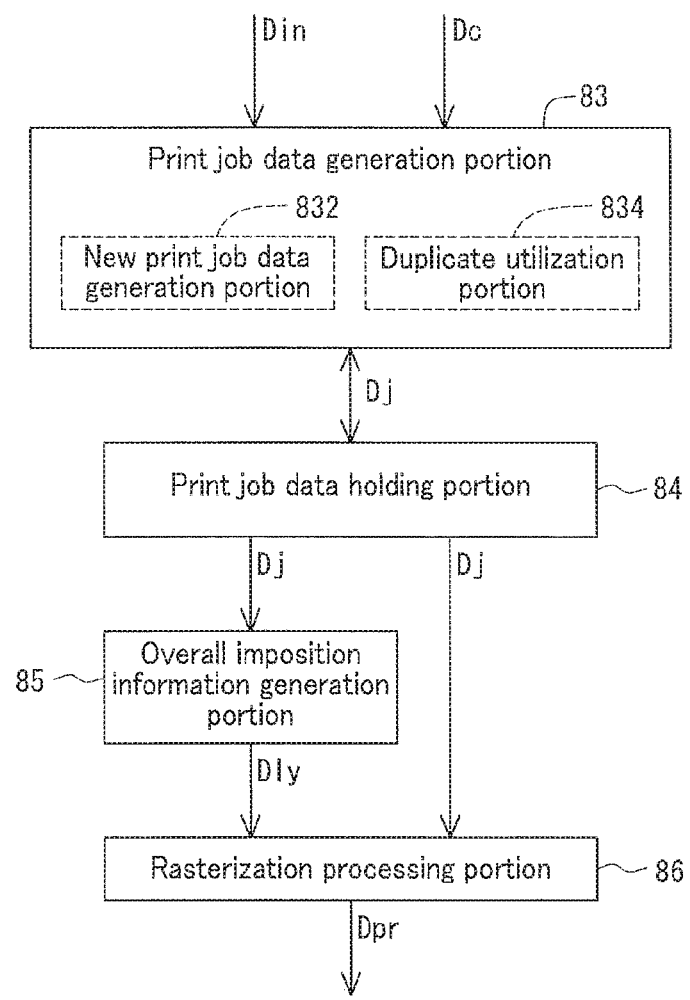
FIG. 15 is a block diagram showing a functional structure of a printing data generation device according to embodiment 2 of the present disclosure.

FIG. 15 is a block diagram showing a functional structure of the printing data generation device 10 in this embodiment. As shown in FIG. 15, the printing data generation device 10 functionally includes a print job data generation portion 83, a print job data holding portion 84, an overall imposition information generation portion 85, and a rasterization processing portion 86. The print job data generation portion 83 includes a new print job data generation portion 832 and a duplicate utilization portion 834.

The print job data holding portion 84, the overall imposition information generation portion 85 and the rasterization processing portion 86 respectively perform substantially the same operations as those of the print job data holding portion 44, the overall imposition information generation portion 45 and the rasterization processing portion 46 in embodiment 1.

The new print job data generation portion 832 in the print job data generation portion 83 newly generates print job data Dj. In more detail, the new print job data generation portion 832 displays, on the display portion 14, substantially the same screen as, for example, the flatplan designing screen in embodiment 1, and accepts an operation of flatplan designing by the operator. Based on the contents of the operation, the submission data Din, and the information Dc on the number of copies, the new print job data generation portion 832 generates the print job data Dj substantially the same as that in embodiment 1. In this embodiment, the contents of the flatplan designing are not held as the template.

The duplicate utilization portion 834 in the print job data generation portion 83 creates a duplicate of the print jog data Dj held by the print job data holding portion 84, and generates print job data Dj for new submission data Din on a new printing target, instead of the existing submission data Din. In this step, in the case where the page size in the submission data Din used to form the duplicate and the page size in the new submission data Din are different from each other, the actual position of each of the pages on the unit printing sheet P when the printing is performed by the printer 20 is determined in accordance with the intra-cell positioning rule while the folding position of the unit printing sheet P (position of the folding line in the sheet width direction) is fixed (see FIG. 8) in substantially the same manner as in embodiment 1. As can be seen, in this embodiment, the operator is allowed to create the new print job data Dj for the new submission data Din on the new printing target, based on the existing print job data Dj, while various settings including the folding position are maintained.

2.2 Operation Example

Figure 16:
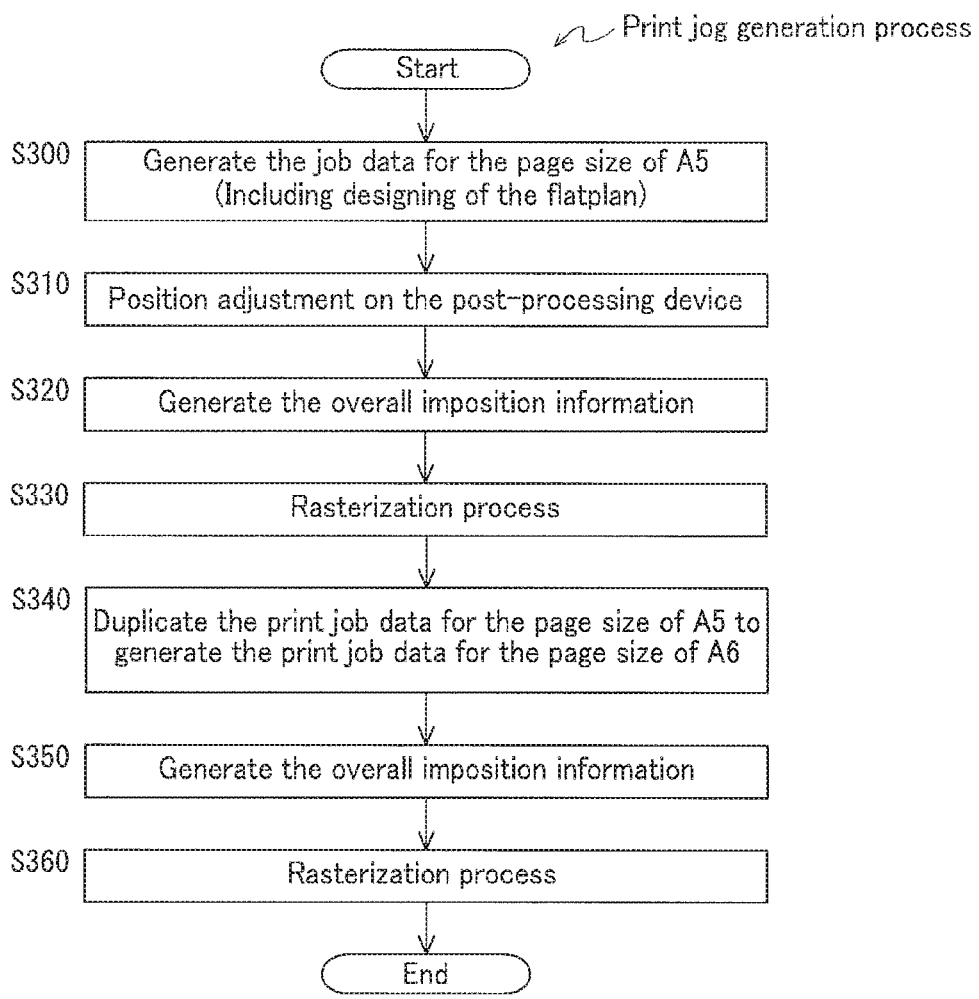
FIG. 16 is a flowchart showing a procedure of a submission data process in embodiment 2 in the case where book printing of A5-size booklets and book printing of A6-size booklets are performed on one line in a plant.
Figure 17:
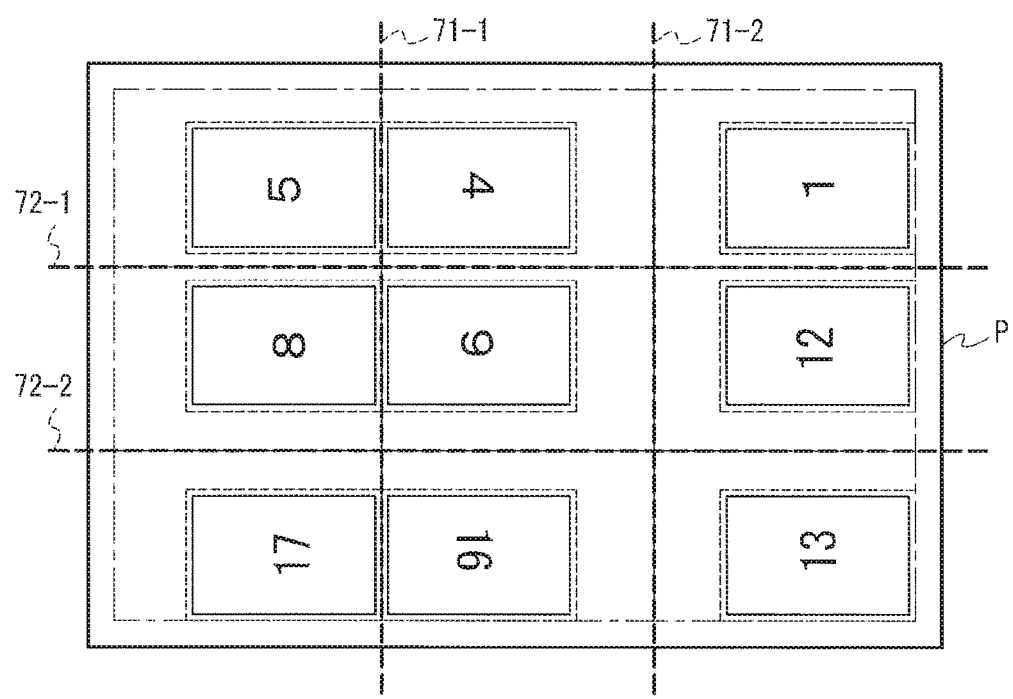
FIG. 17 shows another embodiment of the present disclosure.
Figure 18:
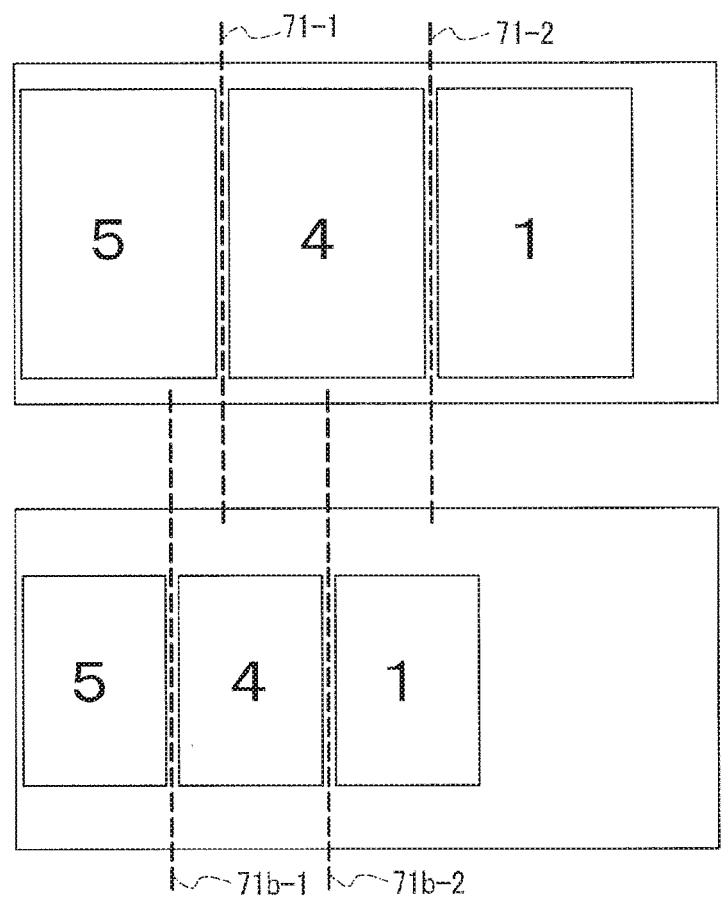
FIG. 18 shows a problem in a printing data generation method of a common technique.

Now, with reference to FIG. 16, a procedure of the printing data generation process in the case where book printing of A5-size booklets and book printing of A6-size booklets are performed on one line in a plant will be described. The procedure shown in the flowchart of FIG. 16 realizes an example of the printing data generation method.

In this operation example, first, a flatplan is designed for the maximum page size of A5 (in the dropdown list 51 on the basic designing screen 5 as shown in FIG. 5, "A5" is selected). This flatplan designing corresponds to the acquisition of the layout information. Then, based on the contents of the design, the submission data Din and the information Dc on the number of copies, the print job data Dj is generated (step S300).

Next, the print job data Dj generated in step S300 is used to generate print job data for a test. The result of the print output performed based on the print job data for the test (printing sheet having the data printed thereon) is used to perform position adjustment on the post-processing device 30 (adjustment on the folding positions of the folder) (step S310). Then, overall imposition information Dly is generated (step S320) and the rasterization process is executed (step S330) like in steps S140 and S150 (see FIG. 11) in embodiment 1.

Next, print job data Dj generated in step S300 is duplicated, and print job data Dj for the new submission data Din on a new printing target, more specifically, on the page size of A6, is generated in accordance with the intra-cell positioning rule set in the print job data Dj with no change in the folding position specified by the print job data Dj (step S340). Then, overall imposition information Dly is generated (step S350) and the rasterization process is executed (step S360) like in steps S140 and S150 in embodiment 1.

The printing data Dpr generated by the above-described process is transmitted to the printer 20, and the printer 20 performs the print output based on the printing data Dpr. In this embodiment, like in embodiment 1, the result of the print output is as schematically shown in FIG. 14. Therefore, when the printing sheet is to be folded by the post-processing device 30 in order to produce booklets, the re-adjustment on the post-processing 30 (re-adjustment on the folding positions of the folder) is not necessary between the process for the A5-size booklets and the process for the A6-size booklets.

2.3 Effects

According to this embodiment, the same effects as those in embodiment 1 are provided even in the case where the flatplan template Dt is not used to generate the print job data Dj.

3. Other Embodiments, Modifications, Etc

In embodiment 1 and embodiment 2, only one page row formed of a plurality of pages arrayed in the sheet width direction is located on the unit printing sheet P (see FIG. 5 through FIG. 8). In the case where the post-processing device 30 is configured to perform the folding process after a printing sheet having data printed thereon and provided in the form of a continuous sheet is cut into unit printing sheets, or in the case where the printing is to be performed on a cut sheet provided as the unit printing sheet, a plurality of page rows may be provided on the unit printing sheet. In this case also, the present disclosure is applicable. In this case, the post-processing device 30 is configured to perform cross folding on the unit printing sheet after the printing. In the case where such a post-processing device 30 is used, the printing data generation device 10 may be configured to operate as follows, as shown in, for example, FIG. 17. The printing data generation device 10 sets, on the unit printing sheet P, the folding lines 71-1 and 71-2 extending in the sheet feeding direction (direction in which the printing sheet is transported) and also folding lines 72-1 and 72-2 extending in the sheet width direction. Then, while fixing the positions of these folding lines (the positions of the folding lines 71-1 and 71-2 in the sheet width direction, and the positions of the folding lines 72-1 and 72-2 in the sheet feeding direction), the printing data generation device 10 determines the actual position of each of the pages in the submission data Din in accordance with the layout specified by the flatplan template Dt as the layout information and the intra-cell positioning rule. The printing data generation device 10 is configured as described above, so that substantially the same effect as the above-described desired effect is obtained in the case where, for example, printing data to be supplied to a printer that performs printing on a cut sheet is to be generated.

In other words, one same flatplan template Dt (layout information) is used regardless of the page size in the submission data Din, so that the actual position of each of the pages in the sheet feeding direction on the unit printing sheet when the printing is performed and the actual position of each of the pages in the sheet width direction on the unit printing sheet when the printing is performed (positions in the first direction and the second direction) are determined in accordance with the layout represented by the flatplan template Dt (layout information) and the set intra-cell positioning rule, while the folding positions in the sheet feeding direction and in the sheet width direction (first direction and second direction) are fixed. In this manner, substantially the same effect as the above-described desired effect is obtained in the case where the unit printing sheet after the printing is folded along the folding positions in the sheet feeding direction and in the sheet width direction (first direction and second direction), namely, in the case where cross folding is performed as the folding process.

In embodiment 1 and embodiment 2, the folding process is provided as an example of post-process performed on the unit printing sheet after the printing, and the folding position as the post-process reference position is specified by the layout information. Instead of, or in addition to, the folding positions, a post-process reference position for another post-process may be specified by the layout information. The post-process reference position indicates the reference position for a post-process performed after the printing based on the printing data.

In embodiment 1 and embodiment 2, the layout information such as the flatplan template Dt or the like is acquired by an operation made by the operator by use of the flatplan designing screen (FIG. 5, FIG. 6). The layout information includes information representing the position, on the unit printing sheet P, of each of the pages of the maximum page size, information representing the folding position, and also information representing the settings on the intra-cell positioning rule. Alternatively, the intra-cell positioning rule may be set by an input operation on a positioning rule designation setting portion including an operation screen as shown in FIG. 7 provided separately from the operation portion for the flatplan designing, instead of being set by the input operation by use of the detailed designing screen 6 in the flatplan designing screen (operation to select the positioning rule by use of the dropdown lists 65a and 65b shown in FIG. 6).

In embodiment 1 and embodiment 2, the layout information such as the flatplan template Dt or the like is acquired by an operation made by the operator by use of the flatplan designing screen (FIG. 5, FIG. 6). Alternatively, a part of, or the entirety of the layout information may be stored on a predetermined storage portion in advance, and the printing data generation device 10 may be configured to acquire the layout information by reading a part of, or the entirety of, the layout information from the storage portion. In this case, the printing data generation device 10 may be configured to acquire a part of, or the entirety of, the layout information via the network 3.

In embodiment 1 and embodiment 2, an inkjet printing device capable of performing printing on a continuous sheet such as a rolled sheet or the like is used. The printer that performs printing based on the printing data Dpr generated by the printing data generation device according to the present disclosure is not limited to such a printer that performs printing on a continuous sheet, and may be an offset printer or a printer that performs printing on a cut sheet.

Embodiments and modifications of the present disclosure are described above with reference to the drawings. The present disclosure is not limited to any of the embodiments and modifications described above, and may be carried out in any of various forms without departing from the gist thereof. The plurality of elements disclosed in the embodiments may be modified when necessary. For example, at least one element among the elements described in one embodiment may be added to the elements in another embodiment. Alternatively, at least one element among the elements described in one embodiment may be deleted.

The drawings mainly show the elements schematically in order to make the disclosure easier to understand. The thickness, length, number, interval and the like of each of the elements shown in the drawings may be different from the actual thickness, length, number, interval and the like for the reason related to the drafting of the drawings. The structure of the elements described in the embodiments is merely an example and is not limiting, and may be modified in any of various manners without departing from the effect of the present disclosure, needless to say.

What is claimed is:

1. A printing data generation device for receiving first printing data including pages for a booklet, and based on the first printing data, generating second printing data for a printer to print the pages on a printing sheet for creating the booklet, wherein the printing sheet is folded along a folding line after the pages are printed, the printing data generation device comprising:
   a layout information acquisition portion configured to acquire layout information that specifies (1) positions of page regions on a unit printing sheet, which is part of the printing sheet that is to be one signature for creating the booklet, and (2) a position of the folding line on the unit printing sheet, wherein each page region is a maximum printable region, and one of the pages is located within corresponding one of the page regions;
   a positioning rule setting portion configured to set a positioning rule for positions of the pages in the page regions;
   a page position determination portion configured to determine the positions of the pages in the page regions in accordance with a size of each page specified in the first printing data, the layout information, and the positioning rule, while the position of the folding line, specified by the layout information, is maintained regardless of the size of each page and the positions of the pages in the page regions; and
   a data conversion portion configured to convert the first printing data into the second printing data based on the positions of the pages in the page regions determined by the page position determination portion;
   wherein: the printer performs the printing on a continuous sheet including the printing sheet, and
   when the printing data generation device receives the first printing data for a first print job to create the booklet and generating the second printing data, and thereafter, receives third printing data including a size of each page that is different from the size of each page in the first printing data, for a second print job to create a booklet,
   the page position determination portion determines positions of the pages on the unit printing sheet, in accordance with a size of each page included in the third printing data, while the position of the folding line, specified by the layout information, is maintained regardless of the size of each page and the positions of the pages in the page regions, and
   the data conversion portion converts the third printing data into fourth printing data based on the positions of the pages determined in accordance with the size of each page included in the third printing data.

2. The printing data generation device according to claim 1, wherein the positioning rule set by the positioning rule setting portion includes one positioning rule selected from alignment along a gutter, alignment along a fore edge and alignment at a center as a positioning rule in a left-right direction of the booklet, and includes one positioning rule selected from alignment along a head, alignment along a tail and alignment at a center as a positioning rule in a top-bottom direction of the booklet.

3. The printing data generation device according to claim 1, wherein:
the layout information acquisition portion acquires a size of a peripheral region, to be provided around four sides of each page region, the size of the peripheral region being acquired as a part of the layout information; and
the page position determination portion determines the positions of the pages on the unit printing sheet in view of the size of the peripheral region.

4. The printing data generation device according to claim 3, wherein:
the peripheral region includes at least one of a bleed region and a margin region; and
the page position determination portion determines the positions of the pages on the unit printing sheet in view of a size of the at least one of the bleed region and the margin region.

5. The printing data generation device according to claim 1, wherein:
the layout information acquisition portion is configured to acquire the layout information by accepting an input operation by an operator; and
the positioning rule setting portion is configured to set the positioning rule by accepting an input operation by the operator.

6. The printing data generation device according to claim 1, wherein the printer performs the printing on a continuous sheet including the printing sheet.

7. The printing data generation device according to claim 1, wherein:
the printer performs the printing on a cut sheet; and
the page position determination portion determines the position of each of the pages to be imposed on the cut sheet, the cut sheet being the unit printing sheet.

8. The printing data generation device according to claim 1, further comprising a template holding portion configured to hold the layout information, acquired by the layout information acquisition portion, as a template,
wherein the page position determination portion determines the positions of the pages on the unit printing sheet, in accordance with the size of each page included in the first printing data, the positions of the pages being determined based on the template held by the template holding portion and the positioning rule set by the positioning rule setting portion.

9. The printing data generation device according to claim 1, wherein:
the printing sheet extends in a first direction in parallel with the folding line, and a second direction perpendicular to the folding line,
the page position determination portion determines the positions of the pages in the page regions in the first direction and the second direction, in accordance with the size of each page included in the first printing data, the positions of the pages being determined based on the layout information acquired by the layout information acquisition portion and the positioning rule set by the positioning rule setting portion.

10. A printing data generation method for receiving first printing data including pages for a booklet, and based on the first printing data, generating second printing data for a printer to print the pages on a printing sheet for creating the booklet, wherein the printing sheet is folded along a folding line after the pages are printed, the printing data generation method comprising:

a layout information acquisition step of acquiring layout information that specifies (1) positions of page regions on a unit printing sheet, which is part of the printing sheet that is to be one signature for creating the booklet, and (2) a position of the folding line on the unit printing sheet, wherein each page region is a maximum printable region, and one of the pages is located within corresponding one of the page regions;
a positioning rule setting step of setting a positioning rule for positions of the pages in the page regions;
a page position determination step of determining the positions of the pages in the page regions in accordance with a size of each page specified in the first printing data, the layout information, and the positioning rule, while the position of the folding line, specified by the layout information, is maintained regardless of the size of each page and the positions of the pages in the page regions; and
a data conversion step of converting the first printing data into the second printing data based on the positions of the pages in the page regions determined in the page position determination step;
wherein: the printer performs the printing on a continuous sheet including the printing sheet, and
when first printing data for a first print job to create the booklet is received and the second printing data is generated, and thereafter, third printing data including a size of each page that is different from the size of each page in the first printing data is received, for a second print job to create a booklet,
in the page position determination step, positions of the pages on the unit printing sheet is determined, in accordance with a size of each page included in the third printing data, while the position of the folding line, specified by the layout information, is maintained regardless of the size of each page and the positions of the pages in the page regions
in the data conversion step, third printing data is converted into fourth printing data based on the positions of each of the pages determined in accordance with the of each page size included in the third printing data.

11. A non-transitory computer-readable storage medium having, stored thereon, a printing data generation program receiving first printing data including pages for a booklet, and based on the first printing data, generating second printing data for a printer to print the pages on a printing sheet for creating the booklet, wherein the printing sheet is folded along a folding line after the pages are printed, the printing data generation program causing a CPU of a computer to execute, by use of a memory:

a layout information acquisition step of acquiring layout information that specifies (1) positions of page regions on a unit printing sheet, which is part of the printing sheet that is to be one signature for creating the booklet, and (2) a position of the folding line on the unit printing sheet, wherein each page region is a maximum printable region, and one of the pages is located within corresponding one of the page regions;
a positioning rule setting step of setting a positioning rule for positions of the pages in the page regions;
a page position determination step of determining the positions of the pages in the page regions in accordance with a size of each page specified in the first printing data, the layout information, and the positioning rule, while the position of the folding line, specified by the layout information, is maintained regardless of the size of each page and the positions of the pages in the page regions; and a data conversion step of converting the first printing data into the second printing data based on the positions of the pages in the page regions determined in the page position determination step;

wherein: the printer performs the printing on a continuous sheet including the printing sheet, and when first printing data for a first print job to create the booklet is received and the second printing data is generated, and thereafter, third printing data including a size of each page that is different from the size of each page in the first printing data is received, for a second print job to create a booklet, in the page position determination step, positions of the pages on the unit printing sheet is determined, in accordance with a size of each page included in the third printing data, while the position of the folding line, specified by the layout information, is maintained regardless of the size of each page and the positions of the pages in the page regions, and in the data conversion step, the third printing data is converted into fourth printing data based on the positions of each of the pages determined in accordance with the size of each page included in the third printing data.

* * * * *